April 21, 1953 H. A. CURRIE 2,635,768

STARCH TRAY FEEDING MACHINE

Filed Dec. 11, 1948 14 Sheets-Sheet 1

INVENTOR.
Hugh A. Currie
BY Brown, Jackson, Boettcher & Dienner.
Attys.

April 21, 1953 H. A. CURRIE 2,635,768

STARCH TRAY FEEDING MACHINE

Filed Dec. 11, 1948 14 Sheets-Sheet 2

INVENTOR.
Hugh A. Currie
BY
Brown, Jackson, Boettcher & Dienner.
Att'ys.

April 21, 1953 H. A. CURRIE 2,635,768

STARCH TRAY FEEDING MACHINE

Filed Dec. 11, 1948 14 Sheets-Sheet 3

INVENTOR.
Hugh A. Currie
BY
Brown, Jackson, Boettcher & Dienner,
Attys.

INVENTOR.
Hugh A. Currie
BY
Brown, Jackson, Boettcher & Dienner.
Attys.

STARCH TRAY FEEDING MACHINE

Filed Dec. 11, 1948 14 Sheets-Sheet 5

INVENTOR.
Hugh A. Currie
BY
Brown, Jackson, Boettcher & Dienner,
Attys.

INVENTOR.
Hugh A. Currie
BY
Brown, Jackson, Boettcher & Dienner.
Attys.

INVENTOR.
Hugh A. Currie
BY
Brown, Jackson, Boettcher & Dienner,
Attys.

April 21, 1953 H. A. CURRIE 2,635,768

STARCH TRAY FEEDING MACHINE

Filed Dec. 11, 1948 14 Sheets-Sheet 8

INVENTOR.
Hugh A. Currie
BY
Brown, Jackson, Boettcher & Dienner,
Attys.

April 21, 1953 H. A. CURRIE 2,635,768

STARCH TRAY FEEDING MACHINE

Filed Dec. 11, 1948 14 Sheets-Sheet 9

INVENTOR.
Hugh A. Currie
BY Brown, Jackson, Boettcher & Dienner.
Attys.

INVENTOR.
Hugh A. Currie
BY
Brown, Jackson, Boettcher & Dienner,
Attys.

April 21, 1953 H. A. CURRIE 2,635,768

STARCH TRAY FEEDING MACHINE

Filed Dec. 11, 1948 14 Sheets-Sheet 11

INVENTOR.
Hugh A. Currie
BY
Brown, Jackson, Boettcher & Dienner,
Attys.

April 21, 1953 H. A. CURRIE 2,635,768

STARCH TRAY FEEDING MACHINE

Filed Dec. 11, 1948 14 Sheets-Sheet 12

INVENTOR.
Hugh A. Currie
BY
Brown, Jackson, Boettcher & Dienner,
Attys.

April 21, 1953 H. A. CURRIE 2,635,768

STARCH TRAY FEEDING MACHINE

Filed Dec. 11, 1948 14 Sheets-Sheet 13

INVENTOR.
Hugh A. Currie
BY
Brown, Jackson, Boettcher & Dienner,
Attys.

INVENTOR.
Hugh A. Currie
BY
Brown, Jackson, Boettcher & Dienner,
Attys.

Patented Apr. 21, 1953 2,635,768

UNITED STATES PATENT OFFICE 2,635,768

STARCH TRAY FEEDING MACHINE

Hugh A. Currie, Chicago, Ill., assignor to Currie Manufacturing Company, Inc., Chicago, Ill., a corporation of Illinois Application December 11, 1948, Serial No. 64,758

11 Claims. (Cl. 214—8.5)

This invention relates to feeders for use with machines for making confections such as candy, in which trays of starch charged with molds of candy are delivered from a stack to a receiving station, dumped, recharged and delivered to a station for stacking, and the recharged trays are stacked for delivery to cooling rooms.

Machines for dumping the candy and starch from the starch trays, separating the starch from the candy, charging the trays with renovated starch, pressing mold cavities in the starch, filling the molds with molten candy mixture, and delivering the charged trays to a station for stacking, to be transferred to a cooling room in which the candy mixture is permitted to set, are well known in this art. Certain of such machines are commonly termed "moguls" and require no detailed description here. A mogul is usually provided adjacent the tray receiving station thereof with a feeder for delivering trays from a stack of trays to the mogul. It is also known to provide a stacker at the delivery end of the mogul, for receiving and stacking the charged trays. My invention is directed to the feeder for delivering the charged starch trays to the receiving station of the mogul with expedition and facility. More particularly, I provide a feeder whereby the trays are delivered to the receiving station of the mogul from a stack of trays in the feeder, the feeder also providing for a reserve stack of trays and having means for automatically moving the reserve stack into the feeder when the stack therein from which trays are being delivered has been exhausted. To that end, I provide means whereby a carriage normally positioned forwardly of the feeder, for moving into it the reserve stack of trays, is moved into the feeder, carrying with it the reserve stack of trays, when the last tray of the preceding stack in the feeder has been raised to a position to clear the entering stack, the carriage being then returned to its normal forward position for engaging a succeeding reserve stack of trays. The tray carriage is operated by power means controlled by a clutch mechanism, this mechanism being controlled by the trays in such manner as to assure movement of the reserve stack of trays into the feeder at the appropriate time and return of the tray carriage to its normal forward position. I also provide means whereby the operation of the feeder is controlled by the operation of the candy molding machine or mogul in such manner as to assure accuracy in delivery of the trays to the receiving station of the mogul. Also, I provide means for straightening the stack in the feeder so as to assure accurate alignment of the trays thereof lengthwise, or transversely of the feeder, such straightening or aligning means being tray controlled. The feeder of my invention enables delivery of the trays to the receiving station of the mogul at higher speed than is possible with any present day feeder with which I am familiar, thereby materially increasing the output of the mogul, an important consideration in this art. Further objects and advantages of my invention will appear from the detail description.

Figure 1:
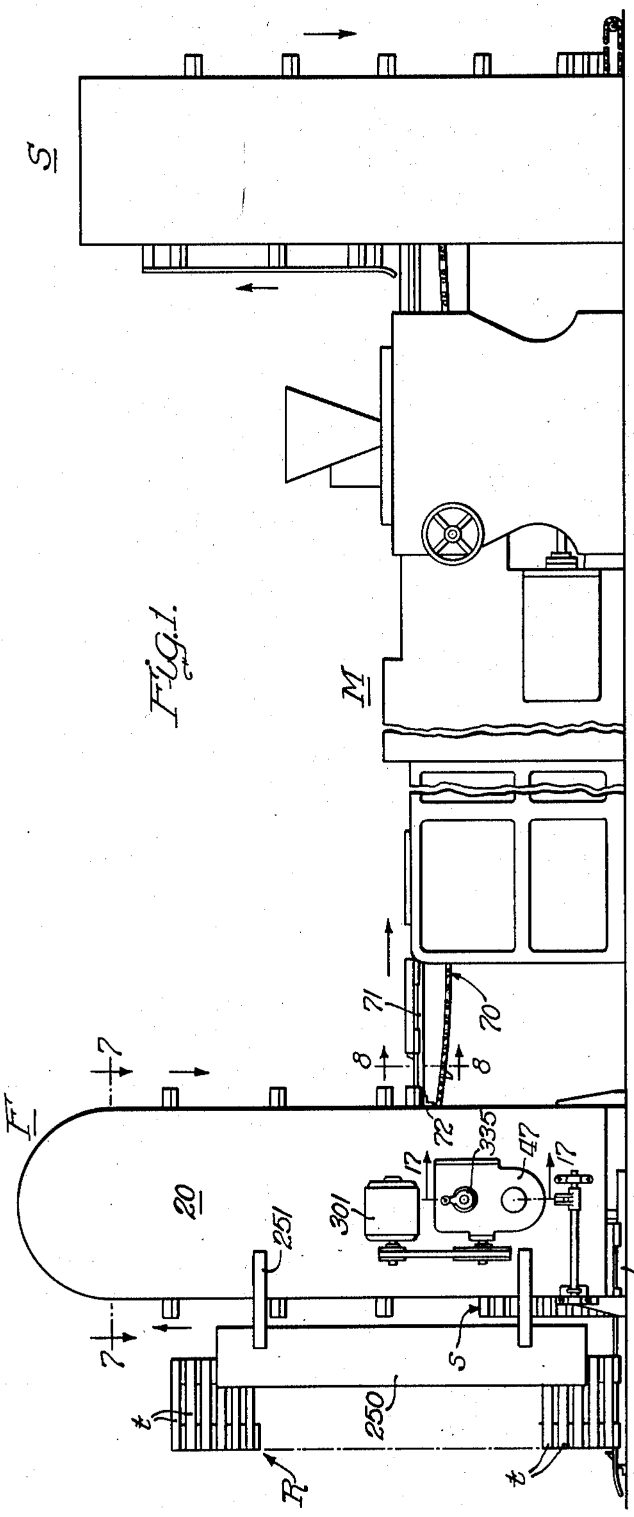
Figure 1 is a semi-diagrammatic side view of a feeder embodying my invention, as used with a candy molding machine or mogul and a stacker therefor, the molding machine being partly broken away.

The complete candy molding or making machine, shown rather diagrammatically in Figure 1, includes a feeder F, constituting the subject matter of my instant invention, which delivers starch trays, charged with cooled and set candy mixture, to a mogul or machine M, which dumps the trays, separates the starch from the candy, refills the trays with renovated starch, presses mold cavities in the starch and recharges the trays with molten candy mixture, and a stacker S to which the recharged trays are delivered by the machine M, the stacker serving to stack the trays for transfer to cooling rooms in which the candy is permitted to cool and set preliminary to delivering the stacks of charged trays to the feeder F. The stacker S preferably is the stacker of my Patent No. 2,266,170, issued December 16, 1941, and the starch trays *t* preferably are of the type disclosed in Patent No. 1,994,664, issued March 19, 1935, to Adolph Pfitzer. These trays are provided at their ends with supporting legs which serve to space the trays, when stacked, apart in superimposed relation. So far as my instant invention is concerned, any suitable stacker and any suitable starch trays may be used.

Figure 2:
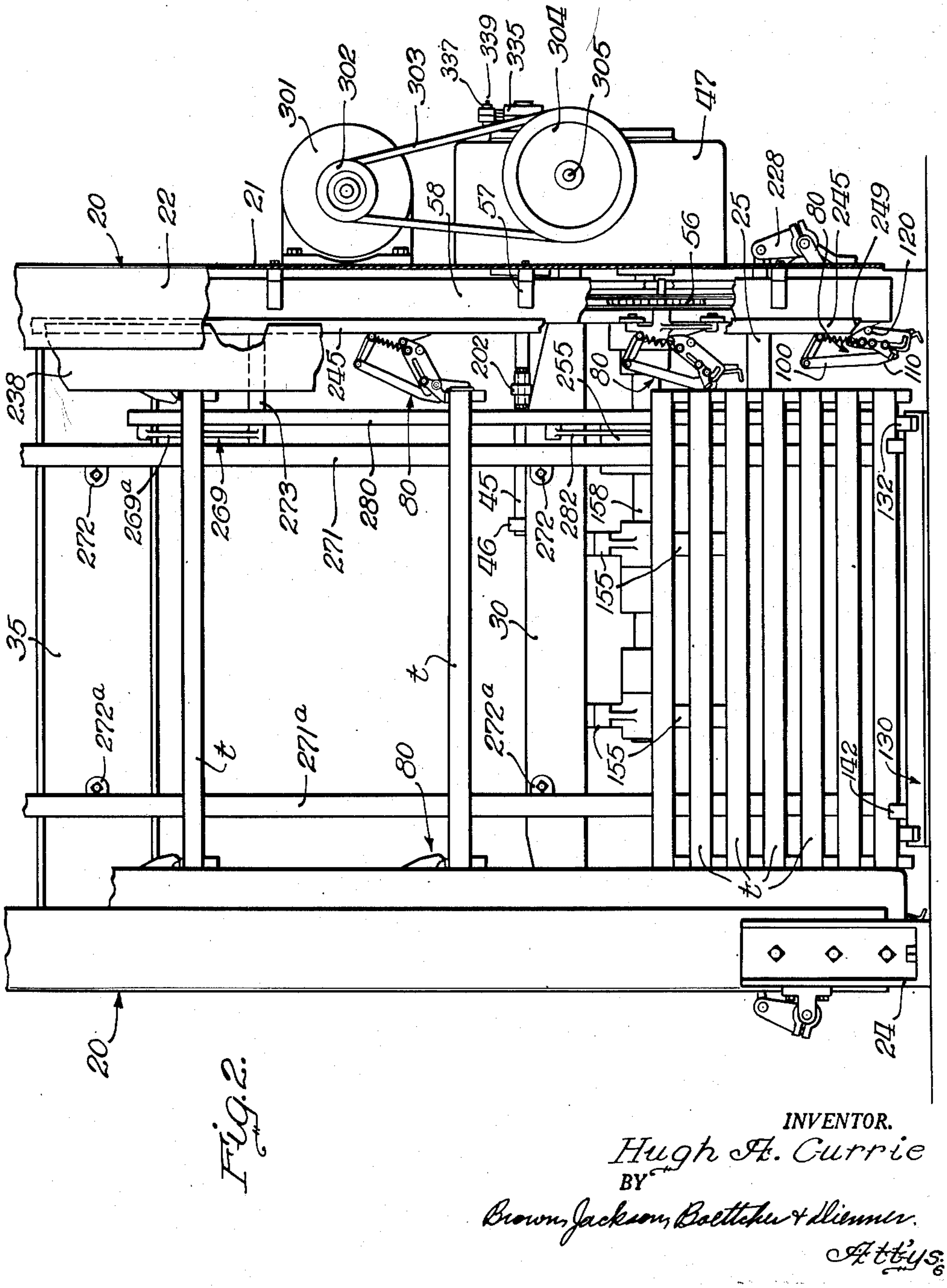
Figure 2 is a front view, on an enlarged scale, of the lower portion of the feeder of Figure 1, with certain parts broken away.
Figures 3, 7:
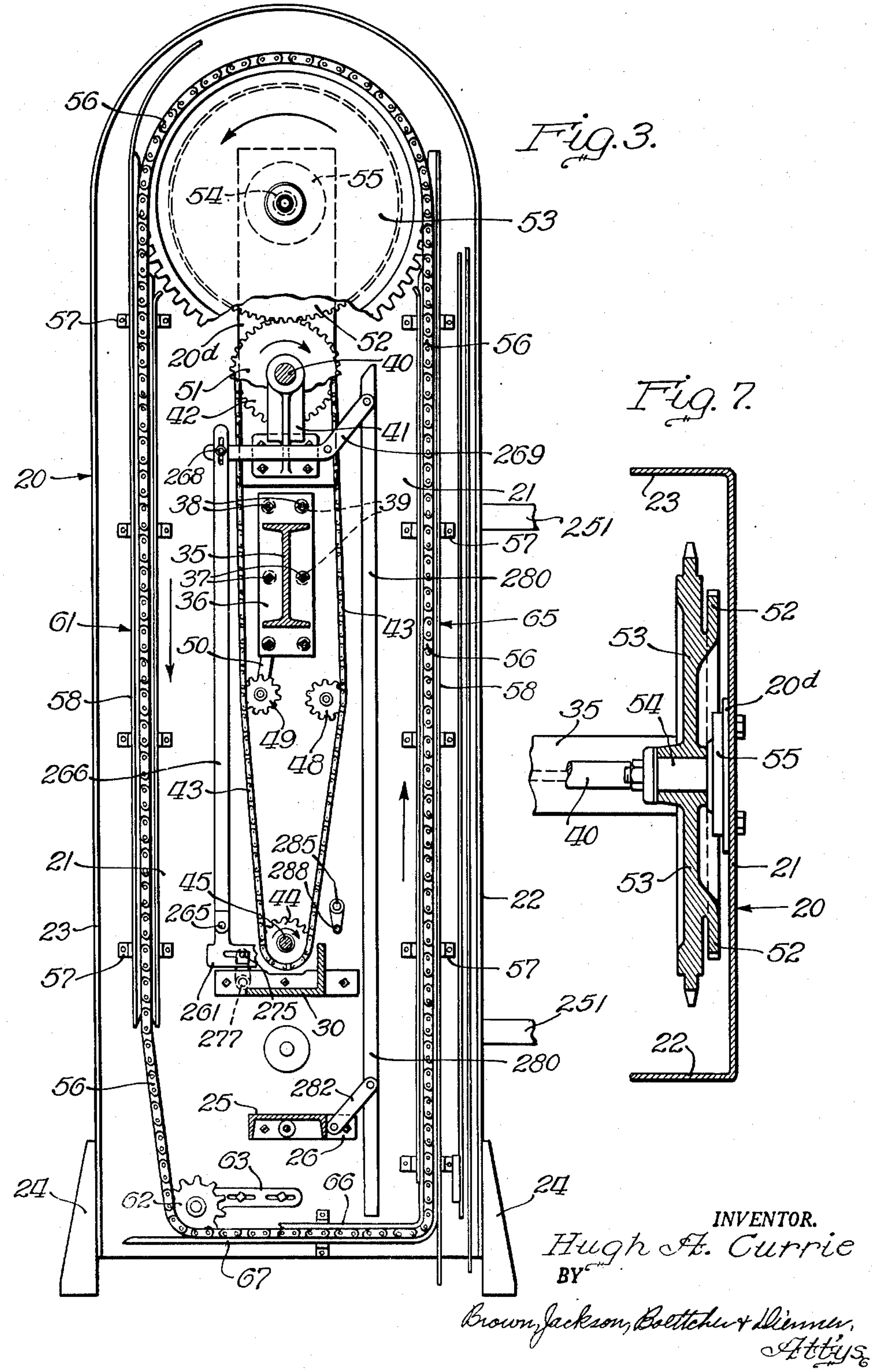
Figure 3 is a vertical sectional view, on an enlarged scale, of the feeder, taken from front to back and looking toward the right side frame, as viewed from in front, certain parts being omitted for clearness of illustration.
Figure 7 is a sectional view, on an enlarged scale, taken substantially on line 7—7 of Figure 1, certain parts being shown in plan.

The feeder F comprises two side frames 20, shown more clearly in Figures 1, 2 and 3, each formed of plate steel of substantial thickness and having an outer side plate 21 and inwardly extending front and back flanges 22 and 23, respectively, the upper end of each side frame 20, including the flanges thereof, being approximately semicircular, as shown in Figure 1. Each of the side frames has bolted thereto mounting brackets 24 for anchoring the side frames to a suitable foundation. Conveniently, this foundation is a continuation of the foundation upon which the molding machine or mogul M is mounted.

The side frames 20 are disposed in spaced opposed relation and are connected together by a cross channel bar 25 extending therebetween about midway between the front and the back thereof. The bar 25 is provided, at each end thereof, with a bolting flange 26 of considerable thickness which receives securing bolts 27 passing through side plates 21 of the frames 20. The bolts 27 also pass through spacing sleeves 28 (Figure 4) disposed between side plate 21 and flange 26 and receive on their inner ends securing nuts 29 at the inner face of flange 26. The side frames 20 are also connected by an angle cross bar 30 extending therebetween and overlying the channel bar 25. The cross bar 30 is provided, at each end, with a bolting flange 31 of considerable thickness through which pass securing bolts 32 (Figure 10) receiving at their inner ends nuts 33, these bolts 32 also passing through side plates 21 of the side frames 20 and through spacing sleeves 34 similar to sleeves 28, confined between side plate 21 and flange 31. A cross I beam 35 (Figures 3 and 5) extends between the side frames 20, above the angle bar 30, and is provided, at each end, with a bolting flange 36 of considerable thickness. The flange 36 is secured to side plate 21 of the adjacent side frame 20 by bolts 37 passing through both thereof and receiving on their inner ends securing nuts 38. Spacing sleeves 39 are disposed about the bolts 37 and confined between side plate 21 and flange 36. By using spacing sleeves 28, 34 and 39 of different lengths, the effective width of the machine may be adjusted to accommodate starch trays of different lengths.

A cross shaft 40 (Figures 3 and 7) extends between the side frames 20, above I beam 35, this shaft being rotatably mounted in brackets 41 bolted to side plates 21 of frames 20. A sprocket wheel 42 is secured on shaft 40 adjacent the right hand side frame 20 of the feeder, as viewed from in front. A sprocket chain 43 (Figure 3) passes over the sprocket wheel 42 and thence downward about a sprocket wheel 44 secured on a shaft 45 rotatably mounted at its inner end in a bearing bracket 46 secured to the angle cross bar 30. The shaft 45 extends outward through side plate 21 of the adjacent side frame 20, into a clutch and gear housing or casing 47 (Figure 1) bolted to the side frame 20. The casing 20 contains suitable gearing and clutch means, as will be explained more fully later, connected to a suitable power source, whereby the shaft 45 is appropriately driven. It will be apparent that when the shaft 45 is rotated, the shaft 40 is likewise rotated in the same direction as shaft 45. One run of the chain 43 passes about an idler sprocket 48 appropriately mounted for rotation on the side frame 20, and the other run of chain 43 passes about a tightener sprocket 49 carried by a bracket 50 bolted for adjustment to flange 36 of the I beam 35. This sprocket 49 maintains the upwardly traveling or slack run of chain 43 under desirable tension, effective for preventing objectionable vibration or slapping thereof.

Two spur gears 51 are secured upon shaft 40, spaced a short distance from the ends thereof.

The spur gears 51 mesh with spur gears 52 (Figures 3 and 7) secured to, conveniently formed integral with, sprocket wheels 53, of materially greater diameter than the sprocket wheel 42, rotatably mounted on stub shafts 54 each provided with a base 55 bolted to side plate 21 of the corresponding side frame 20, adjacent the upper end thereof. It will be seen, from what has been said, that when the shaft 45 is driven, the gear wheels 52, and with them the sprocket wheels 53, are driven oppositely to the spur gears 51. Preferably, each of the side frames 20 has a reinforcing plate $20^d$ (Figures 3 and 7) suitably secured, conveniently by welding, to the inner face of its side plate, in the areas thereof adjacent the shafts, to be later referred to, mounted thereon.

Figure 15:
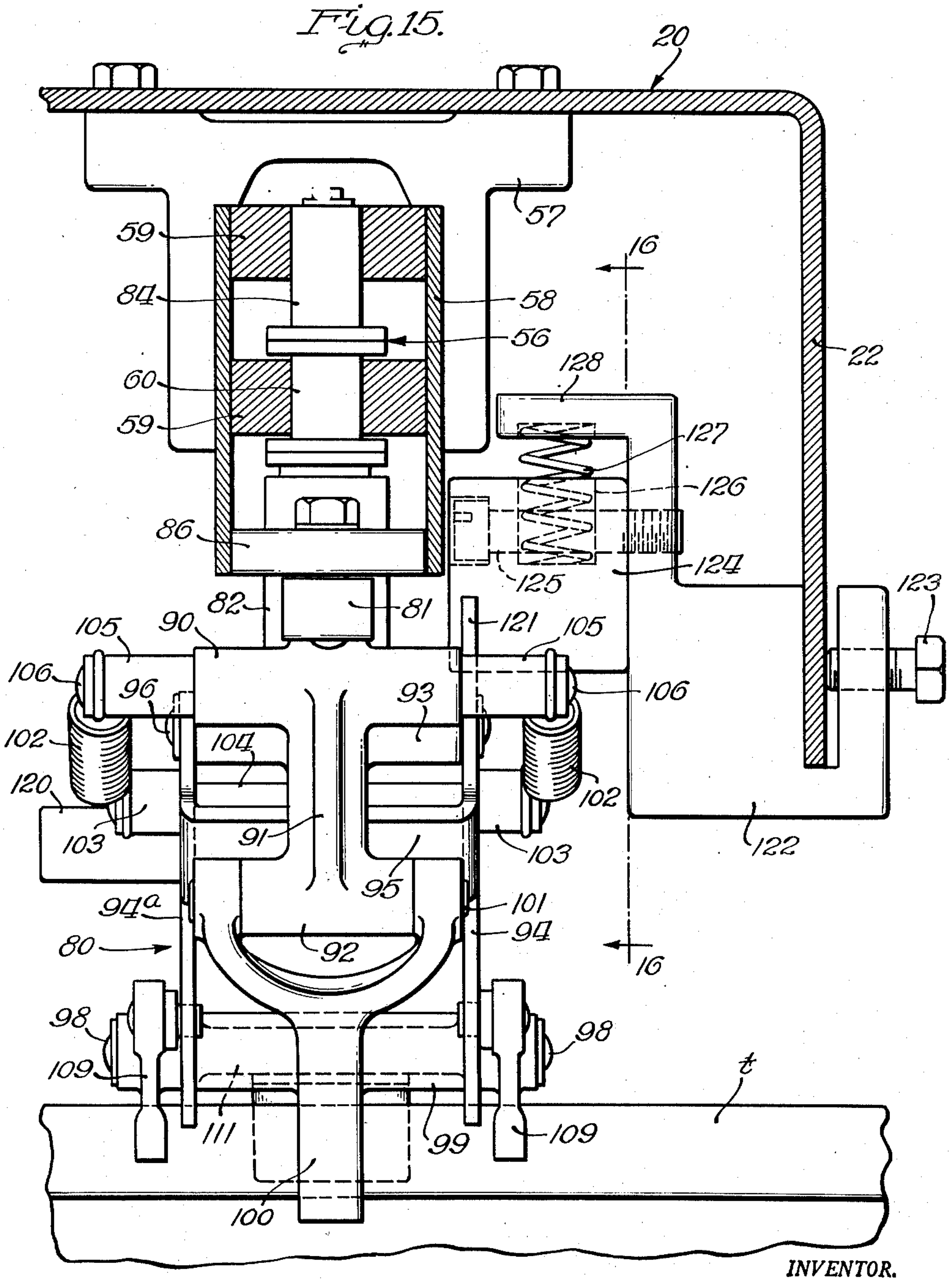
Figure 15 is a horizontal sectional view, on an enlarged scale, taken through the rearward portion of the left side frame of the feeder as viewed from in front, showing in plan a tray hook and the trip means for causing folding thereof, and associated parts.
Figure 16A:
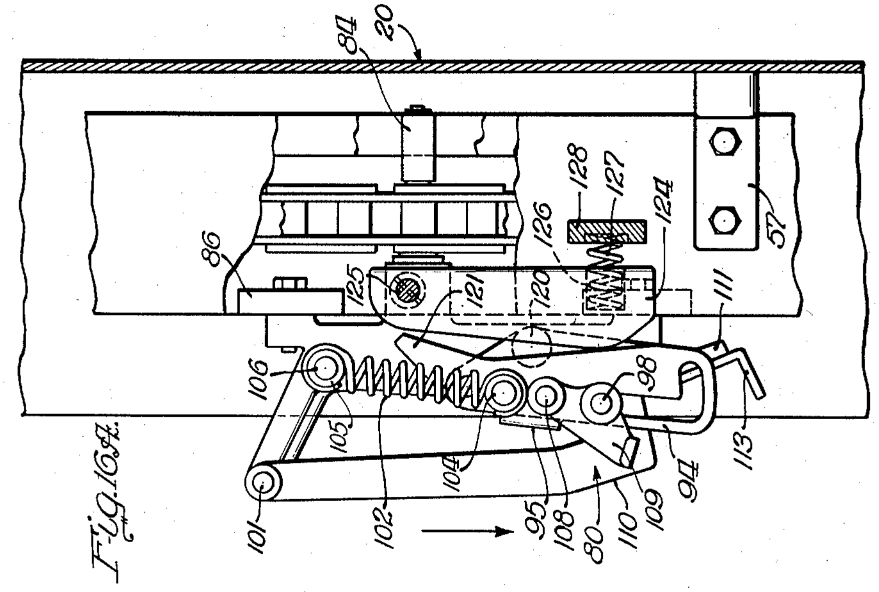
Figure 16A is a view like Figure 16, but with the tray hook in its fully retracted or folded condition.
Figure 16:
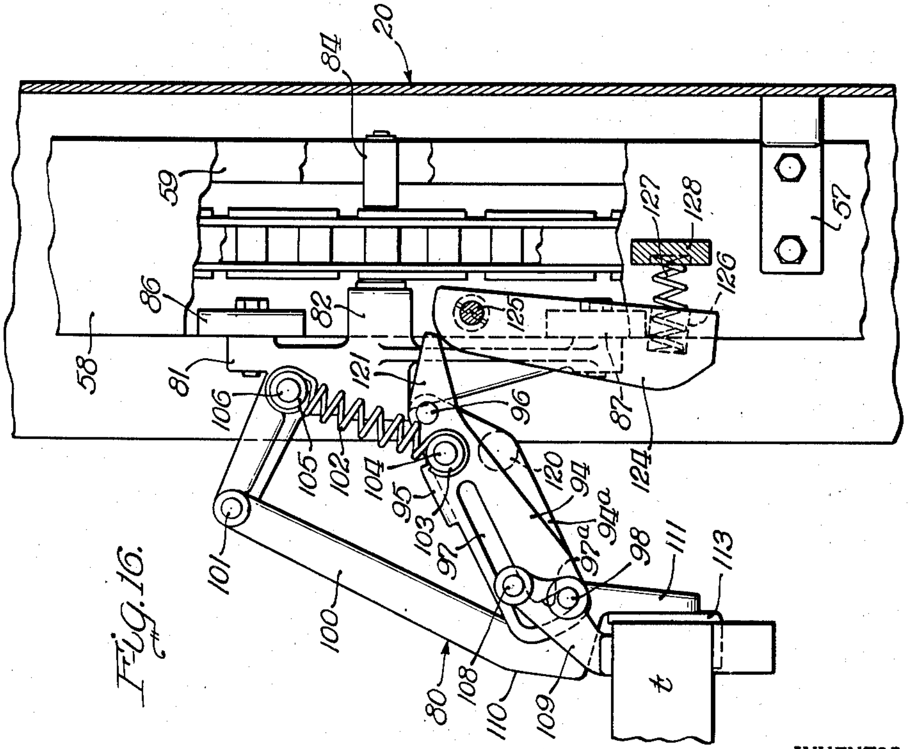
Figure 16 is a sectional view taken substantially on line 16—16 of Figure 15, with the tray hook in its fully extended condition.

A roller type sprocket chain 56, of known construction, passes over each of the sprocket wheels 53 and thence downward along the side frame 20 adjacent the front and the rear thereof. The vertical runs of chain 56 travel in guide structures shown more clearly in Figures 3, 4 and 15. Each of the guide structures comprises a plurality of vertically spaced brackets 57 bolted to side plate 21 of side frame 20. Front and back guide strips 58 are suitably secured in the brackets 57 and define between them an inwardly opening channel. Relatively thick guide rails 59 are secured to the strips 58, at the opposed faces thereof, these rails 59 being arranged in pairs and spaced apart transversely of the brackets 57. The inner pair of rails 59 receive between them the usual rollers 60 loose on the pins connecting the ends of the links of chain 56. The rear chain guide structure, indicated in its entirety by the reference number 61, terminates a considerable distance above the lower end of side frame 20, as is shown more clearly in Figure 3. The lower ends of the guide rails 59 are flared to facilitate downward passage of the chain 56 therebetween and their upper ends are also beveled or flared to facilitate entry therebetween of the chain. The chain 56 travels downward through the guide structure 61, from which it passes downward and forward about an idler guide sprocket 62 rotatably mounted on a bracket 63 adjustably secured, by bolt and slot means, to side plate 21 of side frame 20. The front chain guide structure, indicated in its entirety by the reference number 65, is similar to the rear guide structure, except that the guide rails 59 are provided, at their lower ends, with rearward extensions 66 and 67. The chain 56 passes from the guide sprocket 62 forward between the extensions 66 and 67 of the guide rails, of which extension 66 is disposed above the bottom run of chain 56 and terminates short of the sprocket wheel 62, the extension 67 being below the bottom run of the chain and extending rearward beyond the sprocket wheel 62. It will be clear, from what has been said, that the front guide structure 65, including the extensions 66 and 67 thereof, extends downward to within a short distance of the bottom of side frame 20, and that the chain 56 passes downward through the rear guide structure 61, thence about the guide pulley 62 and from there forward between the extensions 66 and 67 of the front guide rails 59, and then upward through the forward guide structure 65. It will also be clear that the chains 56 and associated parts are carried by the side frames 20 constituting therewith side units of the feeder, so that by adjusting the distance between the side frames 20, in the manner previously described, the effective width of the feeder may be adjusted to accommodate starch trays of different lengths.

Figure 8:
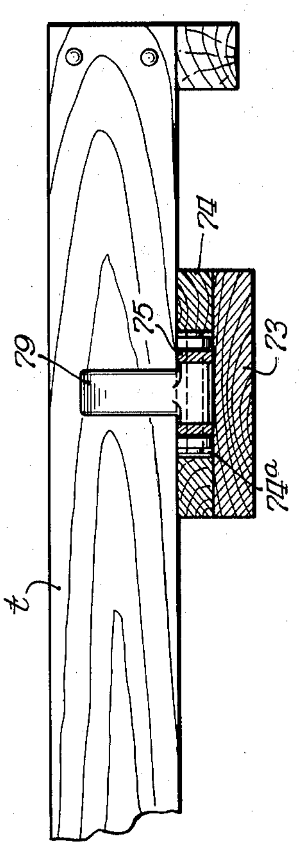
Figure 8 is a sectional view, on an enlarged scale, taken substantially on line 8—8 of Figure 1.

The molding machine or mogul M is provided with a tray conveyor (Figures 1, 5 and 6A) extending into the rearward portion of the feeder a short distance above the lower end of the rear chain guide structures 61 of the respective side frames 20. This conveyor 70 comprises side rails 71 seating on a cross angle bar 72 secured to the side frames 20 of the feeder. Each of the side rails 71 comprises a base strip 73 (Figure 8) and spaced slide strips 74 secured upon the upper face of base strip 71 defining therewith a channel $74^a$ which receives the upper run of a conveyor chain 75. It will be understood that there are two rails 70 and two chains 75, one adjacent each side of the feeder. Each of the chains 75 passes about a sprocket wheel 76 secured on a shaft 77 rotatably mounted at its end portions in bearing brackets 78 secured to the rails 71. The forward portion of the conveyor 70 extending into the feeder provides the tray receiving station of the mogul, to which the trays are delivered by the feeder. Each of the conveyor chains 75 is provided with a plurality of equally spaced cleats 79 of such height as to project above the slide strips 74, for contact with a tray resting thereon at the receiving station, these cleats 79 being arranged in pairs with those of each pair aligned transversely of the conveyor 70.

Each of the chains 56 carries a plurality of equally spaced tray hooks 80, shown more clearly in Figures 4, 14, 15, 16 and 16A. The hook 80 comprises a body 81 provided with a tubular element or sleeve 82 which receives a mounting pin 83. This pin 83 passes through the ends of adjacent links of the chain 56 and outward beyond the chain, receiving the chain roller 60 and, at its outer portion, a roller 84 which operates between the outer pair of guide rails 59, as is shown more clearly in Figure 15. The hooks 80 are thus pivotally mounted on the chains 56 and are arranged in pairs, with those of each pair aligned transversely of the feeder, as will be understood. The body 81 of each hook 80 has mounted thereon top and bottom guide rollers 86 and 87, respectively, which travel between the inner portions of the guide strips 58. When a hook 80 passes downward out of the rearward guide structure 61, it travels with the chain 56 downward and forward to the guide sprocket 62 (Figure 3). The hook then passes forward to the lower ends of the front guide strips 58 and then passes upward with the rollers 86 and 87 between those guide strips, in upright position. The center of gravity of hook 80 is well below the pin 83 so that hook 80 remains in its normal vertical position during its travel from the rearward guide structure 61 to the front guide strips 58.

The body 81 of hook 80 is provided, adjacent its upper end, with a tubular cross head 90 from which an arm 91 extends upward and inward, this arm being provided at its upper end with a tubular cross head 92. Body 81 of hook 80 is further provided, a short distance below the pivot pin 83, with a tubular cross head 93. Two arms 94 and $94^a$, connected by a cross bar 95, are pivoted at their upper ends, at 96, to the cross head 93. Each of the arms 94 and $94^a$ is provided with a bayonet slot 97, these slots receiving a pin 98 extending through a cross head 99 adjacent the lower end of an L-shaped link 100 pivoted at its upper end, at 101, to cross head 92 of arm 91. Tension springs 102 are anchored at their lower ends to short sleeves 103 mounted on the outer end portions of a rod 104 passing through the arms 94 a short distance inward from the pivot 96 thereof. The upper ends of the springs 102 are anchored to sleeves 105 mounted on the end portions of the pin 106 passing through the cross head 90. The springs 102 act as overcenter springs for folding and extending the tray hook 80. When the arms 94 are moved downward and outward, by means to be described later, into such position that the center lines of the springs 102 pass beyond the axis of pivot 96, the springs 102 swing arms 94 downward and outward to their positions shown at the bottom of Figure 2. The downward and outward movement of the arms 94 is limited by contact therewith, at the upper ends of slots 97, of studs 108 operating therein and carried by tray gripper pawls 109 pivoted on the end portions of pin 98. The parts of the hook then occupy their positions shown at the bottom of Figure 2.

When the arms 94 are moved inward from their position shown at the bottom of Figure 2 sufficiently to bring the center line of the springs 102 inside of the axis of pivot 96, the springs 102 swing the arms 94 upward and inward. Assuming that there is a stack of trays $t$ in the feeder, when the arms 94 are swung inward and upward a flattened area 110 at the lower end portion of link 100 contacts the adjacent ends of the trays $t$. The flattened area 110 is of sufficient extent to bridge the space between two adjacent trays, so that the hook 80 moves upward along the stack of trays in partially extended or unfolded condition, as shown by the second hook from the bottom of Figure 2. The link 100 is also provided with a finger 111 extending downward from cross head 99. An L-shaped tray gripper 113 is secured to finger 111 and projects inward therefrom. When the flat area 110 of link 100 passes above the topmost tray of the stack, the springs 102 swing the arms 94 upward and inward a further distance. Such upward and inward movement of the arms 94 brings the lower tray gripper 113 into position engaging the bottom of the tray and, at the same time, the pin 98 enters the then downwardly directed arms 97a of the slots 97. That permits turning of the upper tray grippers 109 about the pin 98 in the further upward movement of arms 94 by tension springs 102, which moves the grippers 109 into contact with the top of the tray end, which is then gripped firmly between the lower gripper 113 and the upper grippers 109, the springs 102 being then effective for maintaining the grippers in gripping engagement with the tray end. It will be understood, from what has been said, that the tray is thus securely gripped at each end and, in the continued upward travel of the tray hooks 80, is lifted from the stack and conveyed upward to the top of the feeder and then downward, after passing about the sprocket wheels 53, to the receiving station of the mogul, at which station the tray is set upon the slide strips 74 of the mogul conveyor 70, as will be explained presently.

One arm—the front arm—94a of the tray hook 80 has secured thereto a forwardly extending stud 120, for a purpose to be explained more fully later. The other arm 94 of the tray hook 80 is provided with an outwardly extending trip finger 121 at its upper end, shown more clearly in Figures 15, 16 and 16A. A mounting bracket 122 is clamped, by a clamp bolt 123 (Figures 5 and 15) to the rearward flange 23 of each of the side frames 20. A trip block 124 is pivotally mounted on clamp 122 by a headed screw stud 125 threaded therein. The block 124 extends downward from screw stud 125 and is provided, adjacent its lower end, with a bore or recess 126 extending from its forward face. A compression spring 127 extends into bore 126 and is confined between the inner end wall thereof and a finger 128 of the bracket 122.

As the tray hooks 80 travel downward, at the rear of the feeder, the trip fingers 121 thereof contact the trip blocks 124. Further downward travel of the hooks 80, for a short distance, serves to swing the arms 94 downward sufficiently to cause the center lines of the tension springs 102 to pass outward beyond the axis of the pivot 96, the springs 102 then acting to swing the arms 94 to their outermost positions, thus completing the folding of the hook 80, which is then spaced outward clear of the tray and the parts of which occupy the positions shown in Figure 16A and at the bottom of Figure 2. The trip blocks 124 are so disposed that the downwardly moving hooks 80 are tripped and folded in the manner stated when the tray carried by a pair of hooks reaches the slide strips 74 (Figures 1, 5 and 8) of the conveyor 70 of the mogul M. In that manner, the tray is released from the hooks 80 and is set upon the tray receiving conveyor of the mogul, after which the cleats 79 of the conveyor chains 75 contact the tray and move it into the mogul. The trip finger 121 of arm 94 first contacts the upper end of trip block 124 (Figure 16) inside of the stud 125 and, after being swung upward, travels downward along the inner face of block 124. The compression spring 127 normally holds the block 124 at an inclination downward and inward of the feeder, sufficient to assure that the arm 94 of tray hook 80 will be swung downward and outward sufficiently to cause the tension springs 102 to completely fold the hook 80. In that manner, I compensate for such differences in length of the trip fingers 121 of the hooks 80 as may exist due to slight inaccuracies in manufacture, the compression spring 127 accommodating outward swinging movement of block 124 while being of adequate strength to assure complete folding of the tray hooks.

Referring to Figures 1, 2, 10 and 12, a suitably constructed carriage frame 130, rectangular in plan, extends between the side frames 20 and projects a considerable distance forward thereof. The frame 130 is provided, at each side thereof, with a tray slide strip 131 curved downward at its forward portion, at 132, to facilitate placing a stack of trays upon the strips 131. As is shown more clearly in Figure 12, the strips 131 taper rearward so that their upper faces are inclined slightly downward and rearward of the feeder, for a purpose to be explained more fully presently. The frame 130 comprises angle side rails 133 each having an angle strip 134 secured to its inner face defining, with the upper flange 135 of rail 133 a guide channel 136. As will be understood, there are two guide channels 136, one at each side of the frame 130, and each of these channels 136 slidably receives the upper flange 138 of an angle strip 139 secured to the outer side of the side rail 140 of a carriage 141, also rectangular in plan, thus slidably mounted in the frame 130. A pawl or cleat 142 is pivotally mounted, by a shouldered cap screw 143, on each side rail 140 of carriage 141 at the front thereof. The cleat 142 is disposed, in major portion, forward of the pivot cap screw 143 (Figure 13) so that it normally is held by gravity in upright position, with its base seating upon an underlying stop plate 145 secured to the side rail 140. Rearward swinging of the cleat 142 is limited by a boss 146 thereof disposed to contact plate 145, so that the cleats may pass beneath a stack of trays on the frame 139 in the forward movement of carriage 141, as will be explained presently, but will be returned by gravity to their normal upright position as soon as they clear the bottom tray of the stack.

Figure 11:
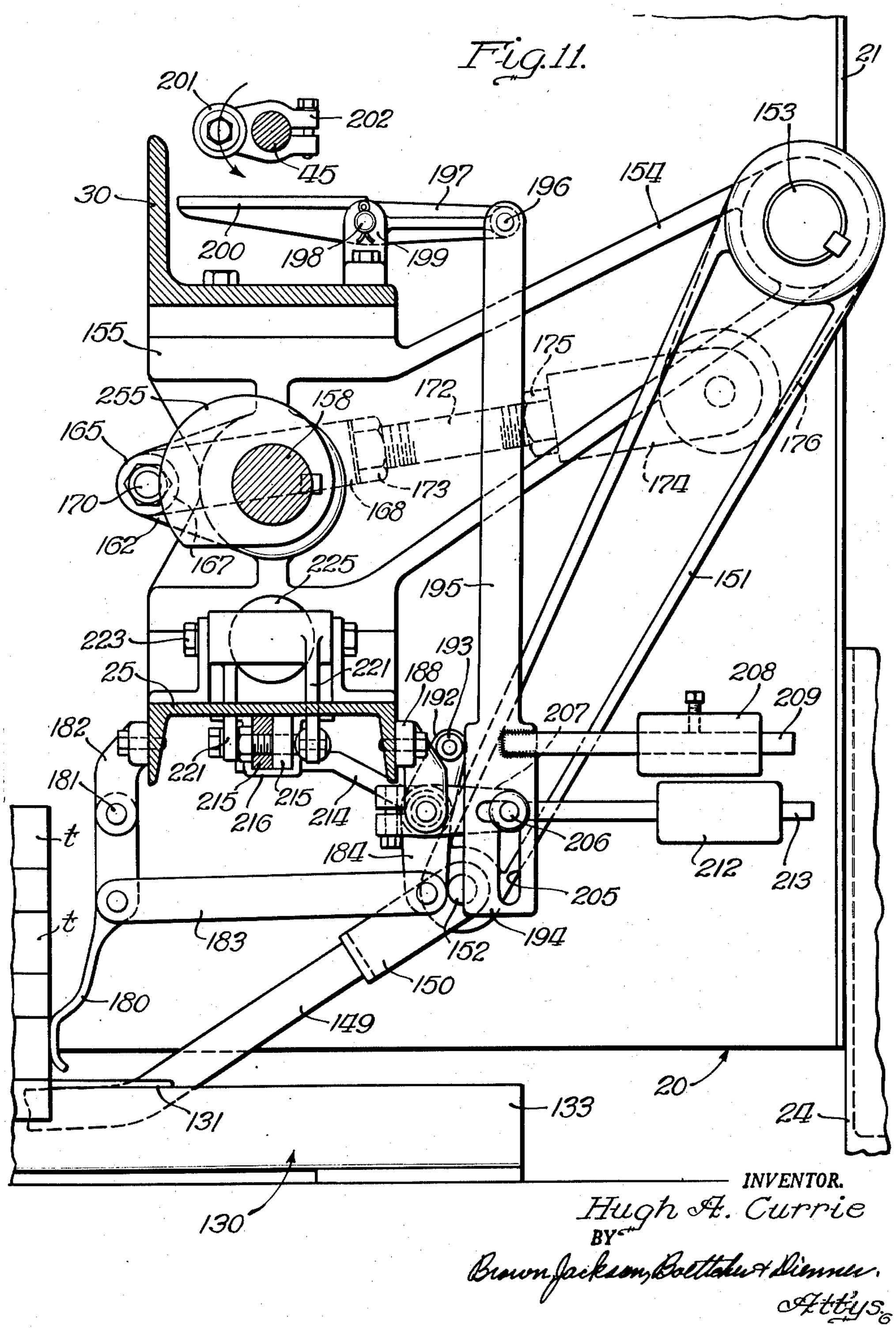
Figure 11 is a sectional view, on an enlarged scale, taken from front to back of the feeder adjacent the right hand side thereof as viewed from in front and looking toward the left, showing the tray carriage operating and control means, and associated parts.

An eye bolt 148 (Figures 5 and 11) is adjustably secured to carriage 141, at the rearward end and adjacent each side thereof. An angle link 149 is pivotally connected at its forward end to bolt 148. A clevis 150 is secured to the rearward end of link 149 and straddles the lower end of an arm 151, to which it is pivoted at 152. As will be understood, there are two arms 151 keyed at their upper ends on a shaft 153 rockably mounted in arms 154 extending upward and rearward from two brackets 155 (Figures 2 and 11) extending between channel bar 25 and angle bar 30, spaced apart lengthwise thereof and bolted thereto. It will be clear, from what has been said, that turning of shaft 153 clockwise, as viewed in Figure 11, imparts forward movement to the carriage 141, and turning of shaft 153 counterclockwise moves the carriage 141 rearward.

A shaft 158 is rotatably mounted through one of the brackets 155 (Figures 10 and 11) and projects a substantial distance outward therebeyond. The outer end of shaft 158 is connected, by a split coupling 159, to a stub shaft 160 extending into the gear and clutch casing 47 and driven, from a suitable power source, through gear and clutch means in that casing. The shaft 158 extends inward beyond its associated bracket 155 and has a crank arm 162 secured upon its inner end. A stub shaft 163 is rotatably mounted in the other bracket 155, coaxial with shaft 158 and projects beyond its associated bracket toward the latter shaft. A crank arm 164 is secured upon stub shaft 163 in spaced relation to crank arm 162. The crank arms 162 and 164 are provided, at their outer ends, with sleeves 165 and 166, respectively, which receive between them the sleeve 167 at the forward end of a T-shaped member 168. A crank pin 170 passes through the aligned sleeves 165, 166 and 167 and is restrained against endwise movement by nuts 171 screwing on its ends. A threaded rod 172 screws into the rearward end of the stem of the T member 168 and is secured in adjustment therein by a jam nut 173. The rod 172 also screws into a clevis 174, in which it is secured in adjustment by a jam nut 175. The clevis 174 straddles the lower end of an arm 176 fixed on shaft 153 between the bracket arms 154. It will be seen that the member 168, screw rod 172 and clevis 174 provide an adjustable link connection between the crank pin 170 and the arm 176. When the shaft 158 is turned through one complete revolution, the crank pin 170 is moved from its normal position shown in Figure 11 through a circular path concentric with shaft 158 and returned to its normal position. During the first 180° of movement of the crank pin 170 the arms 151 are swung rearward thereby moving the carriage 141 to its full rearward position, and during the movement of this pin 170 through the succeeding 180° the carriage 141 is returned to its normal forward position, at which time turning of the shaft 158 is terminated, as will be explained more fully later. In that manner, the carriage 141 is moved to its rearward position, effective for moving a stack of trays into the feeder, and is then returned to its normal forward position preparatory to moving a succeeding stack of trays into the feeder.

A tray actuated trip finger 180 (Figures 5 and 9) is pivoted at its upper end, at 181, to a bracket 182 bolted to channel member 25. Finger 180 is connected, at a point a short distance above its mid-length, by a link 183, to an arm 184 secured at its uper end on an elongated sleeve 185, adjacent one end thereof. This sleeve 185 is rockably mounted on a shaft 186 provided at each end with a reduced stud 187, which studs 187 are rockably mounted in brackets 188 secured to the rear flange of channel member 25 and spaced apart lengthwise thereof. The sleeve 185 is urged in clockwise direction Figure 5—counterclockwise Figure 9, by a weight 189 adjustable along a rod 190 secured to and extending rearward from sleeve 185. When stacked trays are in the feeder, the bottom tray of the stack contacts the lower end of finger 180 and holds it in rearward position in opposition to the weight 189. A second arm 192 is fixed on sleeve 185 at the other end thereof and extends upward therefrom. The arm 192 carries a roller 193 disposed to contact the forward edge of a head 194 at the lower end of a link 195 pivoted at its upper end, at 196, to the rearward end of a lever 197 pivoted at about its mid-length, at 198, in a bracket 199 bolted to the angle bar 30. The lever 197 is provided, at its forward arm, with a plate 200 disposed for contact by a roller 201 carried by an arm 202 fixed on shaft 45. It will be clear, from what has been said, that when the shaft 45 is rotated, the lever 200 is oscillated thereby imparting vertical reciprocation to the link 195.

The head 194 of link 195 is provided with a bayonet slot 205 having a relatively short horizontal upper arm and a relatively long vertical arm, as shown. This slot 205 receives a pin 206 carried by an arm 207 fixed on shaft 186 adjacent arm 192. Head 194 of link 195 is urged forward by a weight 208 adjustably secured on a rod 209 secured to and extending rearward from head 194. The weight 208 normally holds head 194 in its forward position, in contact with roller 193 and with pin 206 disposed in vertical arm of bayonet slot 205. With head 194 disposed in its normal position, reciprocation of link 195 is ineffective for actuating the shaft 186, as will be clear from what has been said. A weight 212, adjustably secured on a rod 213 secured to and extending rearward from arm 207, urges the latter and shaft 186 in clockwise direction, as view in Figure 5—counterclockwise as viewed in Figure 9.

An angular locking finger 214 is secured to shaft 186 and extends upward and forward therefrom. The finger 214 underlies two bars 215 (Figures 10 and 11) slidably mounted in U-brackets 216 bolted to channel member 25. The bars 215 are yieldingly urged outward, by means to be described more fully presently, and each of the bars 215 is provided with an elongated notch 217 (Figure 10) in its lower edge. When the bars 215 are in their normal inner positions, the notches 217 thereof overlap and locking finger 214 then engages in the notches 217 thereby locking the bars 215 in their inner positions. It will be clear, from what has been said, that weight 212 normally holds shaft 186 in an angular position such that the locking finger 214 is effective for locking the bars in their inner position, and holds the finger 214 under pressure against the lower edges of the bars 215 when they are in their outer positions.

Figure 4:
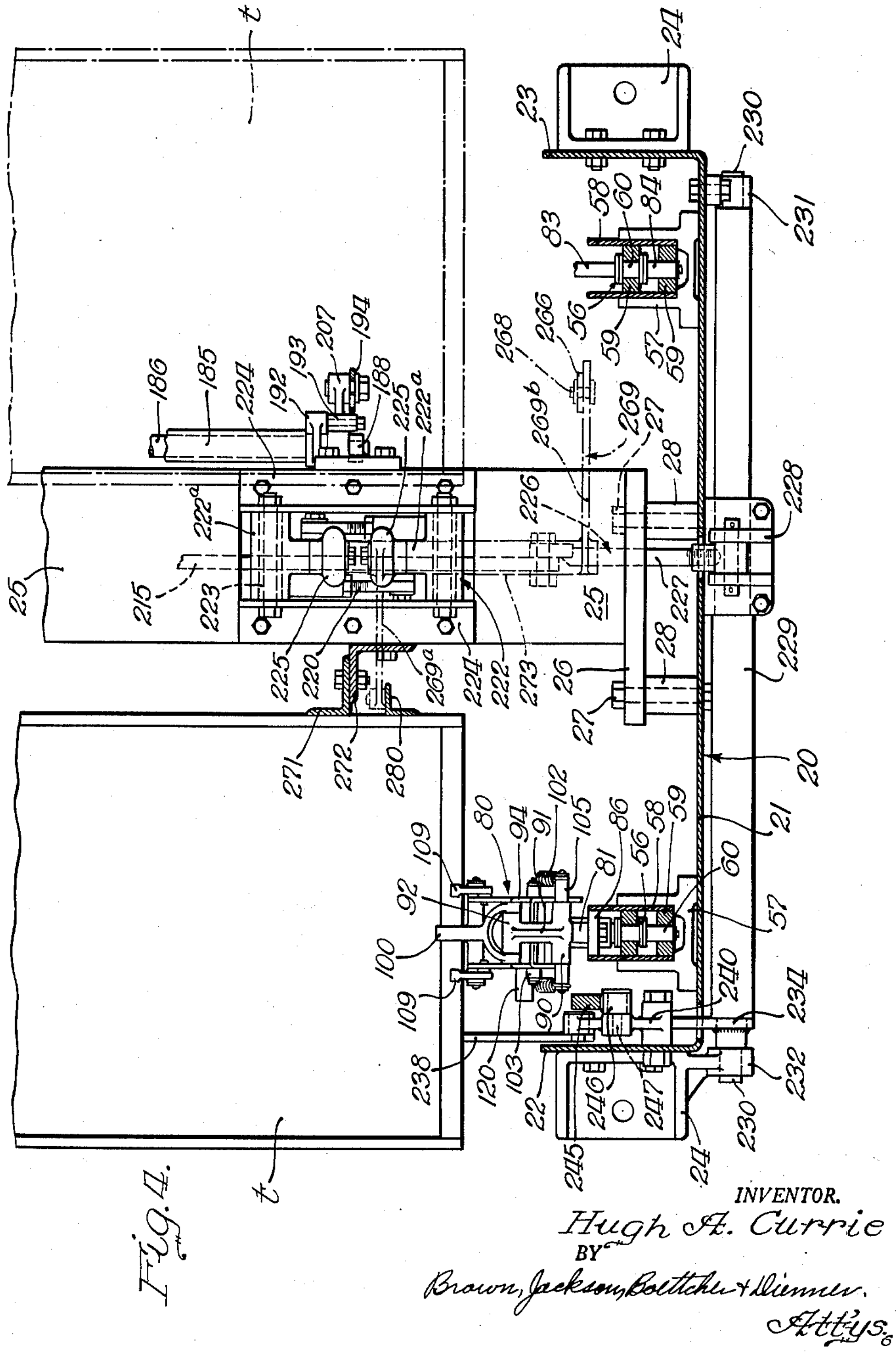
Figure 4 is a fragmentary horizontal sectional view, on an enlarged scale, of the right hand portion, as viewed from in front, of the feeder, taken a short distance above the lower end thereof and looking down.
Figure 10:
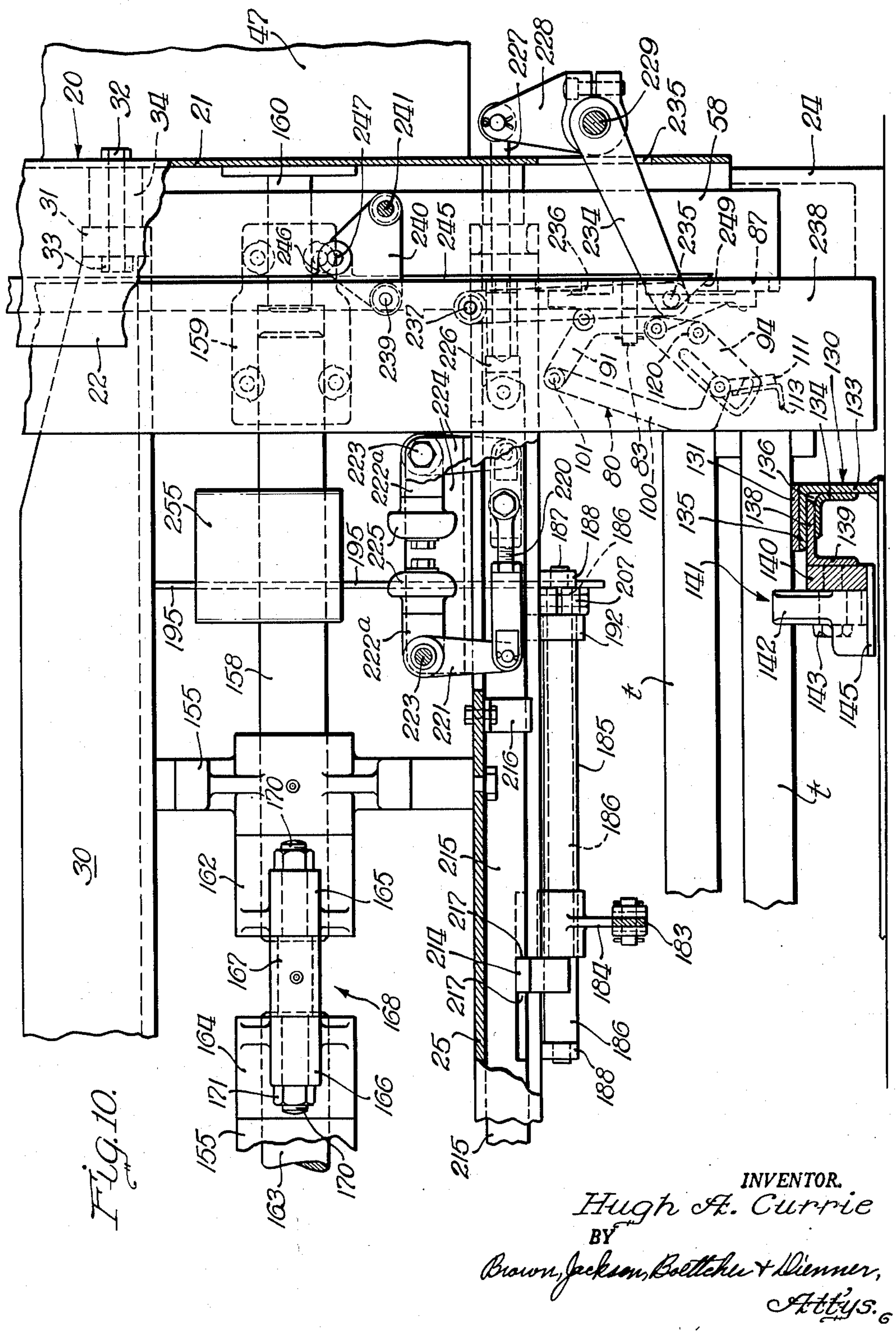
Figure 10 is a view, on an enlarged scale, partly in front elevation and partly in section, of the lower portion of the right hand portion, as viewed from in front, of the feeder, showing the means for projecting the tray stack straightener bars and locking them in projected position, and associated parts.

Each of the bars 215 is connected, by an adjustable link 220 (Figures 4 and 10) to the downwardly extending arm 221 of a bell crank lever 222 pivoted at 223 between two angle brackets 224 bolted to the upper face of channel member 25. The upper arms of the levers 222 are opposed and the downwardly extending arms 221 thereof are connected to the bars 215 in reverse relation. The upper arm $222^a$ of each bell crank 222 has mounted thereon a roller 225. The forward one of the bars 215 is connected to the left bell crank 222, as viewed in Figure 10, and the rearward bar 215 is connected to the right bell crank 222, so that these bars are connected to the bell cranks in reverse relation, as above noted. The forward or front bar 215 is connected, by an adjustable link 226, including an eye bolt 227, to the upper end of an arm 228 secured on a shaft 229 (Figures 10 and 11) extending transversely of the right hand side frame 20 of the feeder, as viewed from in front. The shaft 229 is provided at its ends with reduced studs 230 rockably mounted in bearing brackets 231 and 232, respectively secured to side plate 21 of frame 20 and to a front mounting bracket 24 secured to front flange 22 of frame 20. A second arm 234 is secured on shaft 229, adjacent the forward end thereof, and extends therefrom downward and inward through a slot 235 in side plate 21 of side frame 20. The arm 234 is pivoted at its inner end, at 235, to the lower end of a link 236 pivoted at its upper end, at 237, to a stack straightener bar 238 (Figures 2, 4 and 10). The stack straightener bar 238 is pivotally mounted a short distance from its lower end, at 239, on a triangular mounting plate 240 pivoted at 241 on front flange 22 of side frame 20. The straightener bar 238 is similarly mounted adjacent its upper end on a triangular mounting plate (not shown) similar to plate 240 pivoted to flange 22 of side frame 20, thus providing a parallel linkage mounting for bar 238 effective for maintaining it in vertical position during its movements to and from operative position. It will be understood that there is a straightener bar 238 at each side of the feeder, at the front thereof, each connected to one of the bars 215, and mounted, in the manner above described. Each of the straightener bars 238 is urged upward by a tension spring 243, anchored at its lower end to bar 238 and at its upper end to flange 22 of the side frame, as is shown more clearly in Figure 5. When the feeder is in operation, with the stacked trays therein, the straightener bars 238 are in lowered inner positions with their inner edges in close proximity to the ends of the trays effective for maintaining them in alignment transversely of the feeder. At that time the bars 215 are in their inner positions, in which they are held by the locking finger 214 in opposition to the tension springs 243.

A tray hook throw in or releasing bar 245 (Figures 2, 4 and 10) is provided with an outwardly extending ear 246 pivoted at 247 to the mounting plate 240. The pivot 247 is disposed above and outward of the pivot 239 of the straightening bar 238, for a purpose which will appear presently. This triangular arrangement of the pivots 239, 241 and 247 is of importance and the mounting plate 240 conveniently is of triangular shape, though that is not essential and this plate may be of any suitable shape so long as the triangular arrangement of the pivots is maintained. The throw in or hook release bar 245 is mounted, adjacent its upper end, on the upper triangular plate on which the straightener bar 238 is also mounted, as above described. That provides a parallel linkage which maintains the bar 245 vertical in its movement to and from operative position. The lower end of the hook releasing bar 245 is inclined upward and inward at 249. When the tray straightening bar 238 is in its inner operative position shown in Figures 2, 4 and 10, the hook releasing bar 245 is in its operative position. As previously explained, the tray hooks are in folded inoperative condition when they pass forward to the front guide structure 65 for the tray conveyor chain 56. As the hooks start upward at the front of the feeder, the studs 120 thereof (Figure 2) contact the beveled lower end 249 of the releasing bar 245. In the upward travel of hook 80, the arms 94 thereof are forced inward and upward, until the tension springs 102 pass inward over center, at which time the springs swing the arms 94 upward so as to unfold or extend the tray hook 80 inward. In Figure 2, the lowermost tray hook 80 is in fully folded or inoperative position. When it has been moved upward a short distance from its position shown, the stud 120 contacts the lower end 249 of the releasing bar 245 and the tray hook is then unfolded to the extent permitted by contact of area 110 of the link 100 with the tray ends, as previously described. When the tray hook reaches the top of the stack of trays in the feeder, it moves inward to its fully unfolded or extended position and grips the end of the top tray of the stack, thus lifting that tray from the stack and conveying it to the receiving station of the mogul, as previously described.

A guide plate 250 is mounted on each side frame 20, by suitably disposed straps 251, and extends forwardly thereof. The guide plates 250 are flared outward at their forward edges for reception therebetween of the rearward portion of a reserve stack of trays set upon the strips 131 of the carriage frame 130. When the bottom tray of the stack in the feeder is lifted from the frame 130 (Figures 5, 9 and 11) the tray actuated trip finger 180 is released and the sleeve 185 is then turned clockwise—counterclockwise in Figure 9—by its associated weight. The roller 193 on arm 192 swings head 194 of link 195 rearward, so that the pin 206 is positioned in the upper horizontal arm of the bayonet slot 205. Shortly thereafter, the roller 201 contacts plate 200 of lever 197, thereby raising the link 195 and turning the shaft 186 counterclockwise—clockwise in Figure 9—in opposition to its associated weight 212. That swings the locking finger 214 downward thus releasing the bars 215, as will be understood more clearly from Figure 10. The stack straightener bars 238 are then raised by the tension springs 243, moving the bars 215 outward. Thereafter the locking finger 214 is ineffective and contacts the lower edges of the bars 215, so long as they remain in their outer positions. As the stack straightener bars 238 are moved upward by the tension springs 243, they swing outward about the pivots 241 into inoperative position, spaced an appreciable distance outward beyond the ends of the trays of an entering stack, guarding against interference with movement of the stack of trays into the feeder. Also, as the straightener bars 238 move upward and outward, the hook releasing bars 245 are swung upward and outward into position to clear the studs 120 of the tray hooks 80. The tray hooks now traveling upward at the front of the feeder remain in their fully retracted or folded condition, guarding against interference by the tray hooks with movement into the feeder of a stack of trays. As will be understood from what has been said, when the bars 215 (Figure 10) are moved outward, the upper arms 224 of the bell cranks 222 are swung upward into raised position. The rollers 225 of the bell cranks 222 are disposed in underlying relation to an eccentric 255 secured on shaft 158. This eccentric 255 normally occupies its position shown in Figure 11. When the last tray in the feeder has been lifted from the carriage frame 130 and has been raised to a height to clear the entering stack of trays, the shaft 158 is turned, by means to be explained more fully later, clockwise, as viewed in Figure 11, through one complete revolution. This turning of shaft 158 moves the tray carriage 141 into the feeder, thereby moving the stack of trays into the feeder in proper operative relation thereto, and then returns the tray carriage to its normal forward position, as previously explained. During movement of a stack of trays into the feeder, a reserve stack of trays may be set, conveniently by means of a lift truck, on the outer or forward portion of the frame 130. During the return movement of the tray carriage 141 to its forward position, the cleats 142 thereof swing rearward and downward about their pivots 143, to pass beneath the reserve stack and, as the carriage reaches its full forward position, are returned by gravity to their normal upright or operative position, for contact with the bottom tray of the reserve stack. As the entering stack of trays approaches its full inner or rearmost position in the feeder, the eccentric 255 contacts rollers 225 thereby depressing arms 224 of the bell cranks 222 and pulling the bars 215 inward. As the bars 215 reach their innermost positions, the locking finger 214 engages in the notches 217, effective for locking the bars 215 in their inner or retracted positions, as previously described. Shortly thereafter, the eccentric 255 passes out of contact with the rollers 225 and the shaft 158 is stopped, with the parts in the positions shown in Figure 11. Also, as the stack of trays reaches its innermost or rearward position in the feeder, the bottom tray of the stack contacts the trip finger 180 and swings it rearward about the pivot 181, thereby turning sleeve 185 in counterclockwise—clockwise in Figure 9—direction and returning the roller 193 to its normal forward position. The head 194 of link 195 is returned to its normal forward position, by weight 208, in contact with roller 193, so that pin 206 is then disposed in the vertical arm of slot 205. With the pin 206 so disposed, reciprocation of the link 195 is ineffective for actuating the shaft 186, and the locking finger 214 remains in the overlapping notches 217 of the bars 215.

The eccentric 255 is so disposed that the tray carriage is approaching the limit of its inward or rearward movement when the eccentric 255 contacts the rollers 225 and starts retracting the bars 215. As the bars 215 move inward they turn the shafts 229 (Figures 2, 4 and 10) in counterclockwise direction, thus pulling the stack straightener bars 238 downward. As these bars 238 move downward they also move inward into contact with the ends of the trays of the stack in the feeder, thus accurately aligning the trays of the stack lengthwise or tranversely of the feeder. Thereafter, the straightening bars 238 move downward and outward a slight distance so as to provide slight clearance between the inner edges thereof and the tray ends, as previously explained. As the stack straightener bars 238 move downward and inward, the tray hook releasing bars 245 also swing downward and inward about the pivots 241. Since the bars 245 are pivoted to the plates 240 above and outward beyond the pivot 239 of the straightening bars 238, the inward movement of bars 245 is accelerated relative to that of bars 238 as the latter bars approach their innermost position. Accordingly, the hook releasing bars 245 are moved inward to full operative position as the straightening bars 238 reach their full operative positions. The hook releasing bars 245, as they move inward to operative position, contact the studs 120 of the hooks 80 then in retracted condition and at the front of the feeder. All of such hooks are thus released for movement to extended or unfolded position in the manner previously described. At about that time, the entering stack of trays reaches its innermost or rearmost position in the feeder and the tray carriage 141 is then returned to its forward position. Thereafter, the tray hooks are released to be unfolded as they enter the forward guide structures for the conveyor chains 56 and the upwardly travelling hooks 80 function to lift the trays successively from the top of the stack in the manner previously described.

Figure 6:
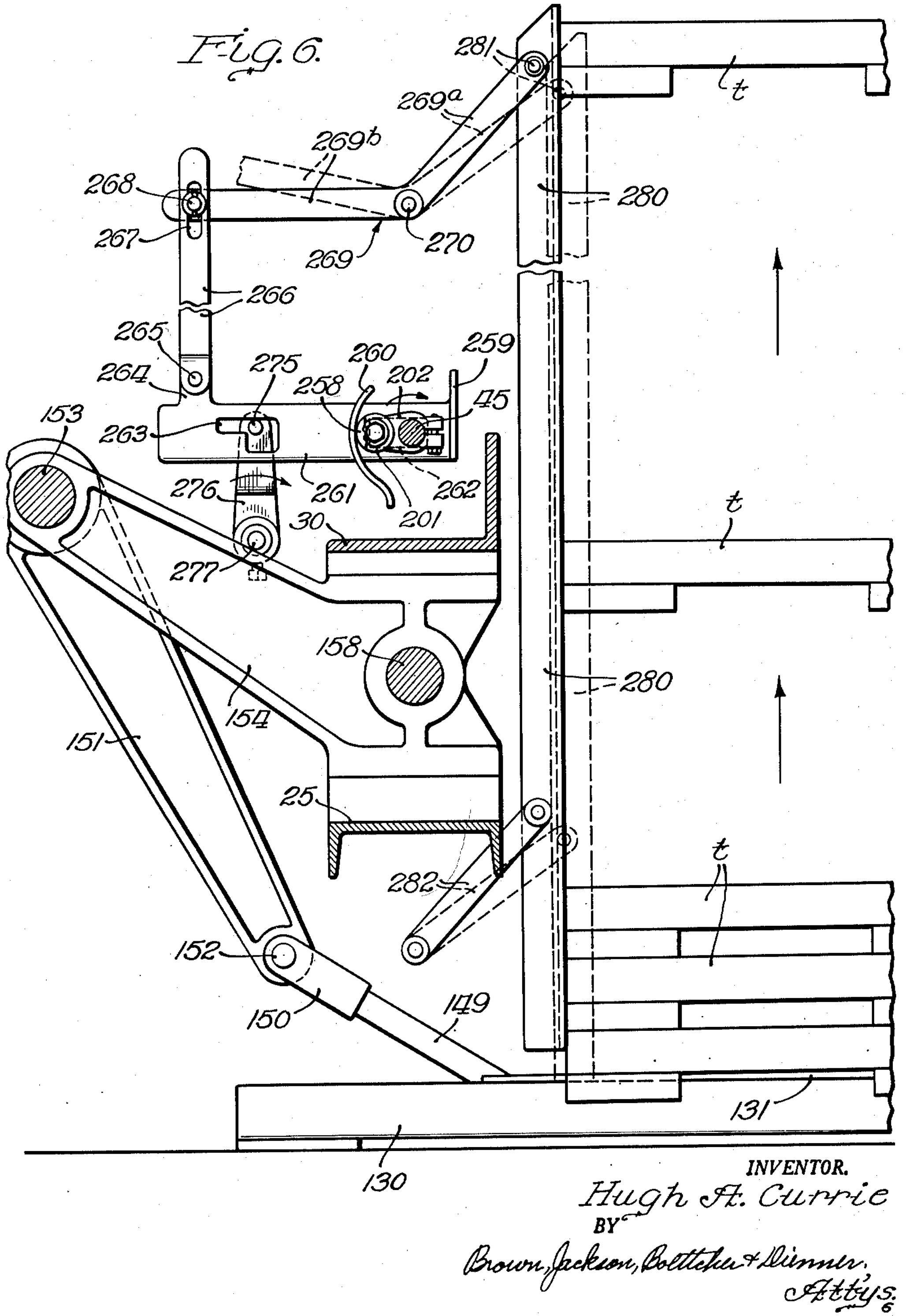
Figure 6 is a fragmentary vertical sectional view of the feeder, on an enlarged scale, taken from front to back and looking toward the right as viewed from in front, showing the control bar and associated parts, the trays being in part broken away.

A second roller 258 (Figures 6, 6A and 6B) is mounted on arm 202 at the outer side thereof. This roller 258 is disposed for contact with two flanges 259 and 260 projecting inward from the forward portion of a plate 261 provided with a lengthwise slot 262 in its forward portion receiving the shaft 45. The plate 261 is thus rockably and slidably supported by shaft 45.

Plate 261 is provided, in its rearward portion, with a bayonet slot 263 and, above such slot, with an upwardly extending ear 264 pivoted at 265 to the lower end of a vertical link 266. The link 266 is provided, in its upper end portion, with a lengthwise slot 267 receiving a pin 268 secured in the rearward end of the rearwardly extending arm $269^b$ of an angle lever 269 pivoted by a through bolt 270 on a mounting plate $270^a$ suitably secured, as by welding, to an angle bar 271. This bar 271 is disposed adjacent the right side of the machine, as viewed from in front, and is secured by brackets 272 to channel member 29, angle member 30 and I beam 35. The angle lever 269 comprises an elongated hub 273 (Figures 2 and 4) through which the pivot bolt 270 passes, and the rearwardly extending arm $269^b$ of lever 269 is clamped on the outer end of hub 273, to clear the trays moving downward at the rearward portion of the feeder. Likewise, the link 266, for the major portion of its length, is disposed outward toward the right side frame 20, to clear the downwardly moving trays. The lower portion of this link 266 is inwardly offset and is pivoted at its lower end to ear 264 of plate 261 by the pivot pin 265. The lower portion of link 266, the pivot pin 265 and the plate 261 and associated parts are disposed below the tray conveyor 70 of the mogul M, and therefore will not interfere with the trays moving downward to the tray receiving station of the mogul.

The bayonet slot 263 of plate 261 receives a pin 275 fixed in the upper end of an arm 276 fixed on and extending upward from a shaft 277. The shaft 277 is rockably mounted in the clutch and gear housing 47 and extends inward therefrom, with its inner end adjacent the outer face of bolting flange 31 of the angle cross frame member 30. The upper portion of arm 276 is offset inward to plate 261 for pivoting thereto as above. The shaft 277 extends into the clutch and gear casing 47 and controls the drive of shaft 158, as will be explained more fully later. A control rail 280 (Figure 6) is pivoted adjacent its upper end to the forwardly extending arm 269ᵃ of angle lever 269, at 281. The rail 280 is connected, at its lower portion, to the angle bar 271 by a link 282 providing, with the forward arm 269ᵃ of lever 269, parallel linkage means effective for maintaining the rail 280 vertical during its forward and rearward movements.

When a stack of trays is moved into the feeder along the strips 131 (Figure 12) it is inclined slightly inward and upward, due to the taper of the strips 131 previously referred to. As the stack approaches its innermost position, the trays thereof successively contact the control bar or rail 280, from the top of the stack downward, and move the bar 280 to its rearward position shown in Figure 6. In the full inner or rearward position of the stack of trays, the trays thereof are disposed in close proximity to the angle bar 271 and a second angle bar 271ᵃ adjacent the left side of the feeder, as viewed from the front, mounted by means of brackets 272ᵃ on the cross frame members 25, 30 and 35. The two angle bars 271 and 271ᵃ are effective for preventing any objectionable misalignment of the trays of the stack transversely thereof or fore and aft of the feeder. The control bar 280 is maintained in its rearward position shown in Figure 6, so long as there are any trays in contact therewith, either resting upon the carriage frame 130 or moving upward along the bar 280, when being raised by the tray hooks in the manner previously described. When bar 280 is in its rearward position, the rear portion of plate 261 is lowered and the pin 275 is then in the horizontal arm of the bayonet slot 263. Reciprocation of the plate 261 is then ineffective for actuating the arm 276.

The control bar 280 is of sufficient height to assure that a tray passing above the upper end of that bar will clear the top tray of a stack of trays entering the feeder. When the bottom tray of the stack in the feeder reaches a position above the control bar 280, that bar moves forward and downward by gravity, turning the angle lever 269 clockwise as viewed in Figure 6. During this movement of the lever 269 pin 268 contacts link 266, at the upper end of slot 267 and moves the link upward, thereby raising the rearward end of plate 261. That causes the pin 275 to enter the vertical arm of bayonet slot 263 so that upon forward movement of plate 261, caused by contact of roller 258 with flange 259, the shaft 277 is turned clockwise. That occurs when the tray reaches a position above the bar 280 a distance equal to the distance between two tray hooks 80. Turning of the shaft 277 clockwise causes the shaft 158 to be turned through one complete revolution, thereby moving a new stack of trays into the feeder and returning the control bar 280 to its rearward position, as previously described. Prior to the movement of the new stack of trays into the feeder, the trip finger 180 has been released and the stack straightener bars 238 and the tray hook releasing bars 245 have been moved outward to their inoperative positions, these bars being returned to and locked in their inner operative positions as the stack of trays approaches its full inner or rearward position in the feeder, as has been previously described.

Figure 17:
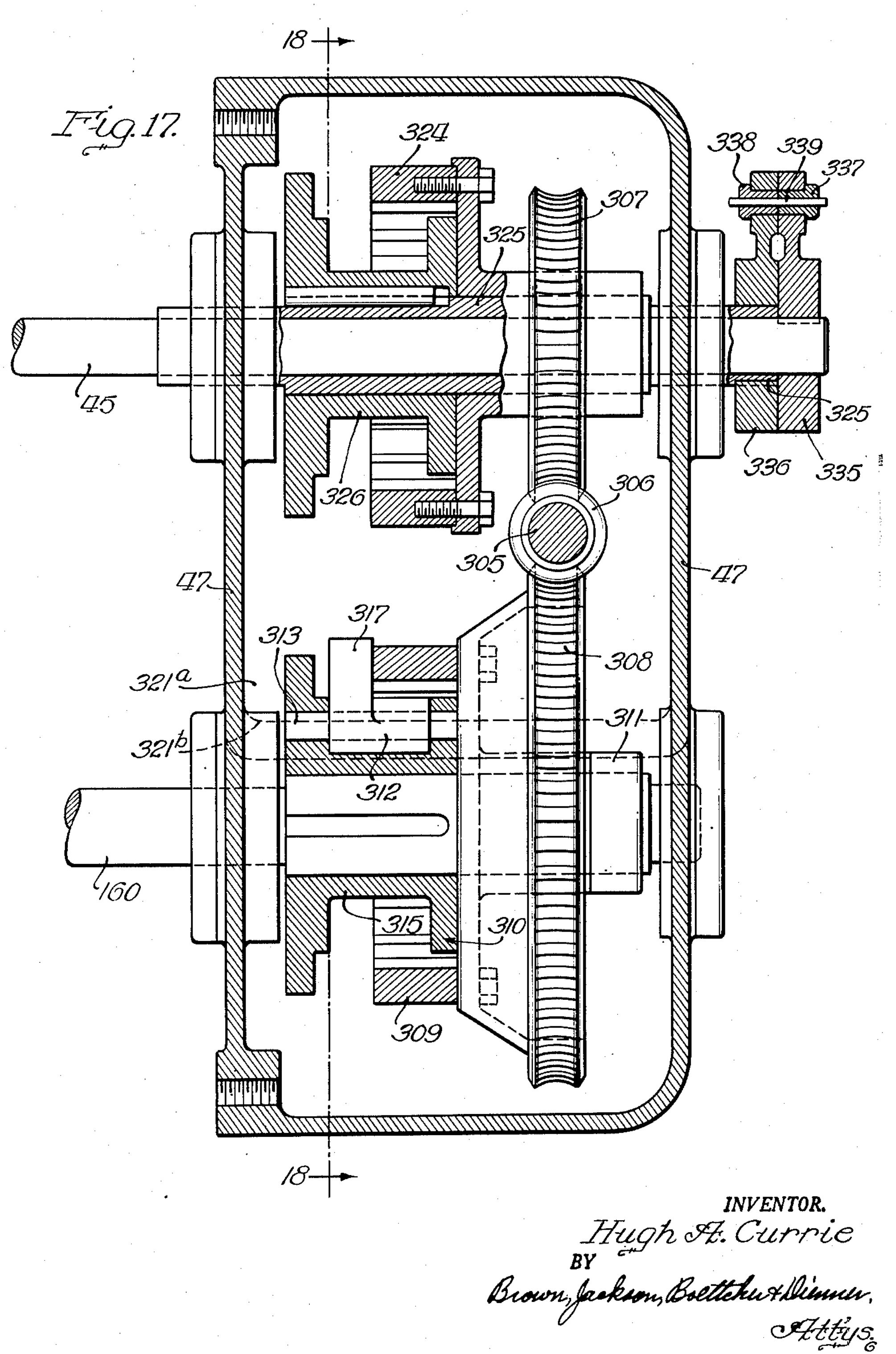
Figure 17 is a sectional view, on an enlarged scale, of the gear and clutch casing and the parts therein, taken substantially on line 17—17 of Figure 1, certain parts being shown in elevation.

An upper shaft 285 (Figures 6A, 17 and 18) is rockably mounted in the clutch and gear casing 47 and extends therefrom an appropriate distance inward beyond the adjacent side frame 20. This shaft 285 controls a clutch for driving the shaft 45, this clutch being a one revolution clutch which normally is disengaged, as will be explained more fully later. An arm 287 is fixed on shaft 285 and extends downward therefrom. A pin 288, fixed in the lower end of arm 287, extends through a bayonet slot 289 in the forward end of a link 290 pivoted at its rearward end, at 291, to the lower end of a lever 292. This lever 292 is pivoted, a suitable distance above its lower end, at 293, on a bracket 294 bolted to the angle cross bar 30. A tension spring 295, anchored to arm 287 and to the angle bar 271, urges the shaft 285 in counterclockwise direction, as viewed in Figure 6A, and normally holds it in position for disengaging the clutch which controls drive of the shaft 45. A tension spring 297 is anchored to a forwardly extending arm 298 on bracket 294 and has its rearward end anchored to the lever 292 below the pivot 293 thereof. The tension spring 297 urges the lever 292 in counterclockwise direction and normally holds it in a rearward position, with the link 290 in its forward position, in which the pin 288 is disposed at the rearward end of bayonet slot 289 underlying the vertical arm of that slot. The lever 293 is so positioned that the upper arm thereof is contacted by the cleats 79 of the right hand, as viewed from in front, mogul conveyor chain 75. The link 290 overlies the roller 201 carried by arm 202. When the clutch controlling shaft 45 is disengaged, that shaft is stopped and the arm 202 is then in its position shown in Figures 6 and 6A. When a cleat 79 of the mogul conveyor chain 75 contacts the upper arm of lever 292, that lever is swung to its position shown in Figure 6A, link 290 being then in its rearward position with pin 288 in the horizontal arm of the bayonet pin 289. When cleat 79 passes out of contact with the upper arm of lever 292, tension spring 297 returns the lever 292 to its rearward dotted line position and moves the link 290 to its forward position. When link 290 reaches that position, the forward end thereof drops downward so that the pin 288 is now disposed in the vertical arm of slot 289. When a succeeding cleat 79 of the mogul conveyor chain 75 contacts the upper arm of lever 292, it swings that lever in clockwise direction thereby pulling the link 290 rearward. That turns the shaft 285 clockwise, effective for engaging the clutch for driving the shaft 45. The latter shaft 45 is then turned through a complete revolution during the first portion of which the roller 201 raises link 290, thereby releasing pin 288 and permitting shaft 285 to be returned to its normal position by the tension spring 295. Thereafter, in the continued turning of lever 292 clockwise, the link 290 is ineffective for actuating the shaft 285. In the continued rotation of shaft 45, roller 201 actuates the lever 197 (Figure 11), thereby reciprocating the link 195. If at that time there are one or more trays in the feeder resting upon the carriage frame 130, the reciprocation of link 195 is ineffective. In the event the bottom tray of a stack in the feeder has been raised from the carriage frame 130, the stack straightener bars 238 and the tray hook release bars 245 are moved outward to their inoperative positions, and a new stack of trays is moved into the feeder when the tray being raised has cleared the control bar 280; in the manner previously described.

The sprocket wheel 44 and the gears 51 and 52 are so proportioned that each time the shaft 45 is actuated and turned through one revolution, the tray conveyor chains 56 of the feeder are advanced a distance equal to the space between two adjacent tray hooks 80 thereon. In that manner I assure that the loaded trays are delivered to the mogul conveyor at the receiving station thereof accurately and without objectionable jarring of the trays. Further, the operation of the feeder is controlled by the mogul tray conveyor, in respect to delivery thereto of trays by the feeder, the speed of operation of the feeder being such that the trays are set down at the receiving station of the mogul in advance of the successive pairs of cleats 79 of the mogul conveyor chains 75, to be picked up thereby and advanced into the mogul. In that manner I effectively eliminate risk of trays being delivered to the mogul conveyor being interfered with by the cleats of the mogul conveyor, to the end of speed and accuracy in delivery of the trays. Further, when operation of the mogul is stopped temporarily, as frequently happens, operation of the feeder also is stopped so that no difficulty arises from having the feeder continuing operation while the mogul is out of operation. The operation of the feeder is thus timed and controlled by the operation of the mogul, with the advantages mentioned. Within the broader aspects of my invention, the shaft 285 may be actuated in timed relation to the operation of the mogul in any suitable manner, as and for the purpose above stated. It will also be noted that operation of the tray track carriage, for moving a reserve stack of trays into the feeder, is controlled by the shaft 45 and, therefore, is under control of the mogul. That is advantageous in assuring that the last tray removed from the carriage frame 30 will be disposed above the control bar 280 a sufficient distance to clear the top tray of a reserve stack of trays being moved into the feeder, the control bar 280 being of appropriate length to that end. That guards against the possibility of the top tray or trays of the entering stack of trays engaging and being displaced by the upwardly traveling tray.

An electric motor 301 (Figures 1 and 2), which is a constant speed motor of known type, is bolted to the right side frame 20 of the feeder, as viewed from in front. A V-pulley 302 is secured upon the shaft of motor 301 and has driving connection, through a V-belt 303 to a V-pulley 304 secured on a stub shaft 305 (Figures 17 and 18) rotatably mounted in the casing 47 and projecting forwardly thereof. A worm 306 is secured upon the inner end of stub shaft 305 and meshes with upper and lower worm gears 307 and 308, respectively, within the casing 47. The lower worm gear 308 is mounted for rotation on the stub shaft 160 extending into and rotatably mounted in the casing 47. An interiorly toothed clutch ring 309 is suitably secured, as by bolting or otherwise, to the worm gear 308. A spool 310 is keyed on stub shaft 160 and the gear 308 is confined between spool 310 and a collar 311 secured on the outer end portion of stub shaft 160. A clutch pawl 312 is pivoted at 313 on spool 310 and is movable outward into engagement with the clutch ring 309. The pawl 312 is provided with a bore or recess extending from its inner face, in which seats a compression spring 314 confined between hub 315 of spool 310 and the outer end of bore 316. Pawl 312 is provided with an arm 317 extending outward across the ring clutch member 309. A trip finger 318 is secured upon shaft 277, which extends into the casing 47. This finger is provided at one end with a bill 320 normally disposed to be contacted by arm 317 of pawl 312. The finger 318 normally is held in its inner position by a compression spring 322. Finger 318 is provided at its other end with a stop element 321 integral therewith. The element 321 is disposed to contact a cover $321^a$ removably secured over an access opening $321^b$ through the rear wall of housing 47, when finger 318 is in its inner operative position, for limiting inward movement of the latter. The worm gear 308 is continuously rotated at constant speed in the direction indicated in Figure 18, so long as the motor 301 is in operation. When the shaft 277 is turned clockwise by the plate 261 (Figure 6) the trip finger 318 is moved to releasing position and the pawl 312 is then moved outward by the compression spring 314 into clutching engagement with the clutch ring 309. The spool 315, and with it the shaft 160 and the shaft 158, then turns with the worm gear 308. When the new stack of trays has been moved into the feeder, the rearward end of plate 261 is lowered, thereby releasing shaft 277 and the trip finger 318 is returned to operative position by compression spring 322. When the shaft 160 has completed one revolution, arm 317 of pawl 312 again contacts bill 320 of finger 318 and is returned to its disengaged position, thereby declutching the shaft 160 from the worm gear 308. It will be clear, from what has been said, that the clutch for driving the shaft 160 is a one-revolution clutch, effective for turning that shaft through one complete revolution and then stopping it, each time the shaft 277 is turned in clockwise direction, as viewed in Figure 6, by forward movement of the plate 261.

Figures 6A, 6B, 9:
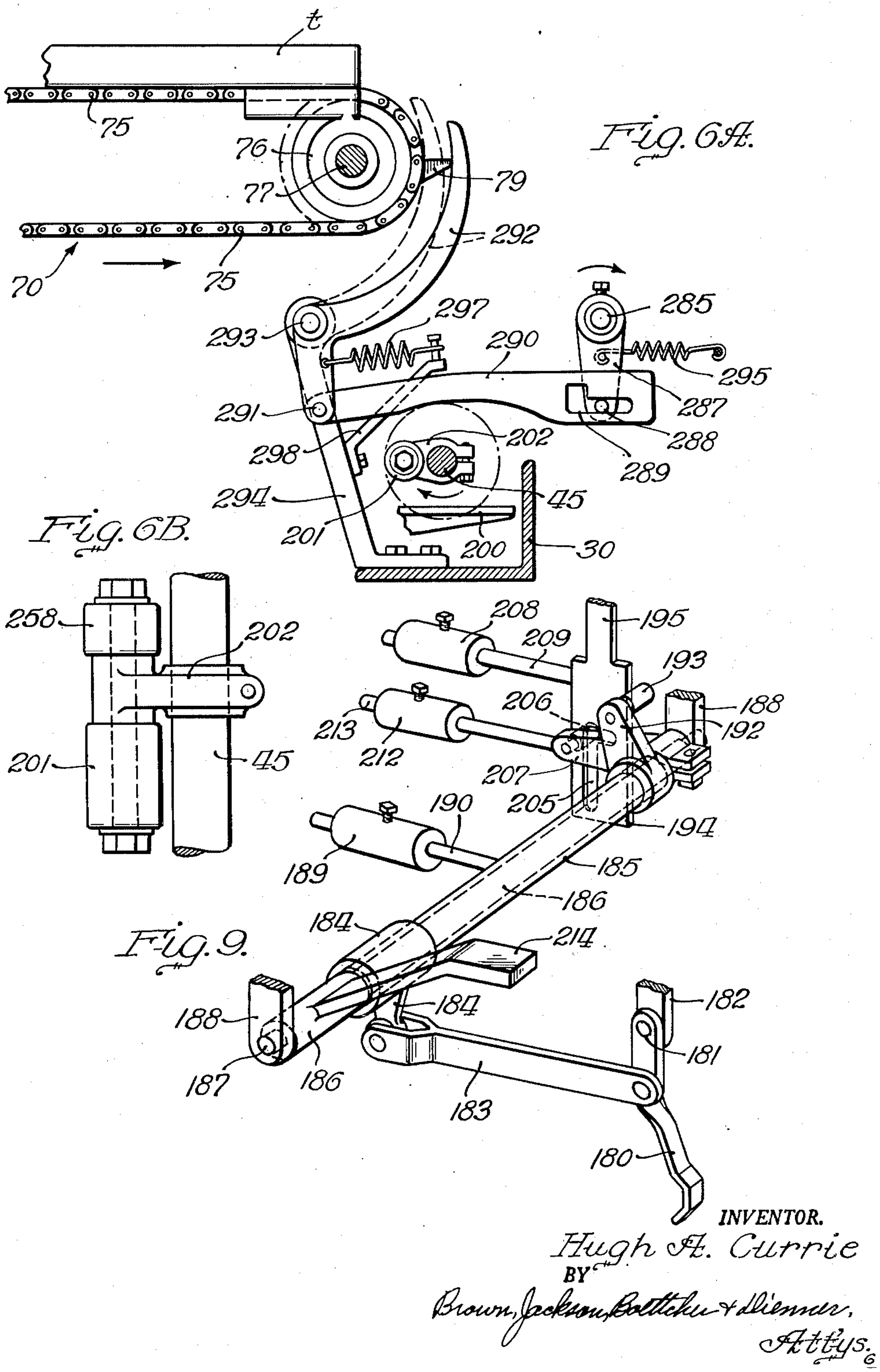
Figure 6A is a fragmentary sectional view, on an enlarged scale, taken from front to back of the lower portion of the feeder and looking toward the right thereof as viewed from in front, showing the means for controlling actuation of the clutch for driving the main drive shaft.
Figure 6B is a plan view, on an enlarged scale, of the main drive shaft, broken away in major portion, and of the arm and the rollers carried by that shaft for actuating the main drive shaft control means and the means for actuating the tray stack carriage operating means.
Figure 9 is an isometric detail view of the tray actuated finger and the locking bar and associated parts for controlling operation of the tray straightening rails and the tray hook releasing bars.
Figure 18:
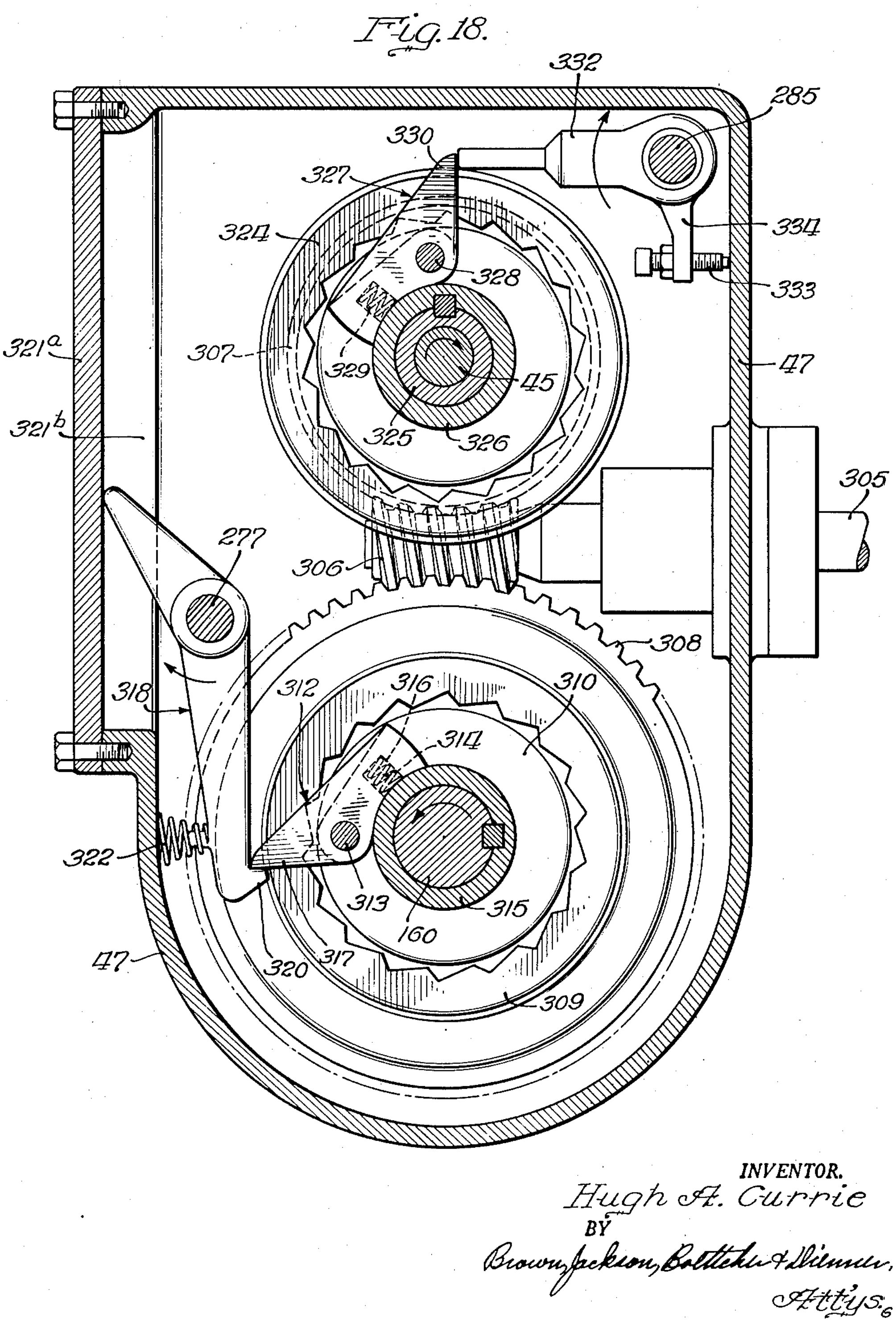
Figure 18 is a sectional view taken substantially on line 18—18 of Figure 17.

The shaft 45 (Figures 6 and 17) extends into the clutch and gear casing 47, as previously noted. A quill 325 is rotatably mounted in casing 47 and on shaft 45. The upper worm gear 307 is rotatably mounted on quill 325 and, as noted, has secured thereto, by bolting or otherwise, an interiorly toothed clutch ring 324. A spool 326 is keyed on quill 325 and carries a clutch pawl 327, similar to the lower clutch pawl 312, pivoted on a pin 328. The pawl 327 is urged in clutching or engaging direction by a compression spring 329. The pawl 327 is provided with an outwardly extending arm 330 disposed to contact the inner end of a trip finger 332 secured on shaft 285, when trip finger 332 is in its normal lowered position. The shaft 285 extends into housing 47 at the upper forward corner thereof, above worm gear 307. The shaft 285 is urged in counterclockwise direction by tension spring 295 (Figures 6A and 18). A stop screw 333 is threaded through a lug 334 extending downward from the hub of finger 332. Screw 333 is disposed to contact the front wall of housing 47, in cooperation therewith limiting turning movement of shaft 285 and finger 332 in counterclockwise direction, as will be clear.

An arm 335 (Figure 17) is keyed upon the outer end of shaft 45 in close proximity to a similar arm 336 keyed on the outer end of quill 325. Each of the arms 335 and 336 carries a bushing 337 and 338, respectively, suitably secured therein. The bushings 337 and 338 receive a shear pin 339 inserted therethrough establishing driving connection between quill 325 and shaft 45. It will be seen that when spool 326 is clutched to the ring 324, the quill 325 will be driven and will drive the shaft 45 through the shear pin 339. In the event of an overload, the pin 339 will be sheared thus preventing breakage or serious damage to the feeder.

As previously explained, when cleat 79 of chain 75 of the mogul conveyor 70 passes out of contact with the upper arm of lever 292, this lever is swung rearward by the tension spring 297 and the link 290 is moved forward into such position that the pin 288 (Figure 6A) is disposed in the vertical arm of the bayonet slot 289. When the lever 292 is turned clockwise by a succeeding cleat 79 of chain 75, the shaft 285 is turned clockwise, thus turning the trip finger 332 (Figure 18) counterclockwise into releasing position. The pawl 327 then moves outward into engagement with the clutch ring 329 clutching the spool 326 thereto. The shaft 45 is then turned in clockwise direction, as viewed in Figures 6, 6A and 18, and the roller 201 carried by arm 202 contacts the lower edge of link 290 and raises it to a position in which the pin 288 is disposed in the horizontal arm of the bayonet slot 289. That releases the arm 287 which is then returned to its normal position by the tension spring 295, thus returning trip finger 332 to its normal position. When the shaft 45 has been turned through a complete revolution, the finger 332 trips pawl 327 and holds it in releasing position, thus stopping rotation of shaft 45. During this turning of shaft 45 through one revolution, the roller 201 also actuates the lever 197 (Figure 11), which is ineffective so long as one or more trays are positioned on the carriage frame 130, as previously explained. Also, during the turning of shaft 45 through one complete revolution, the roller 258 (Figures 6, 6A and 6B) carried by arm 202 reciprocates the plate 261, but such reciprocation of plate 261 is ineffective for actuating the shaft 277 so long as the control bar 280 is held in its rearward position, that is, so long as there is a stack of trays on the carriage frame 130, or one or more trays are being moved upward along the bar 280; as previously explained.

Figure 5:
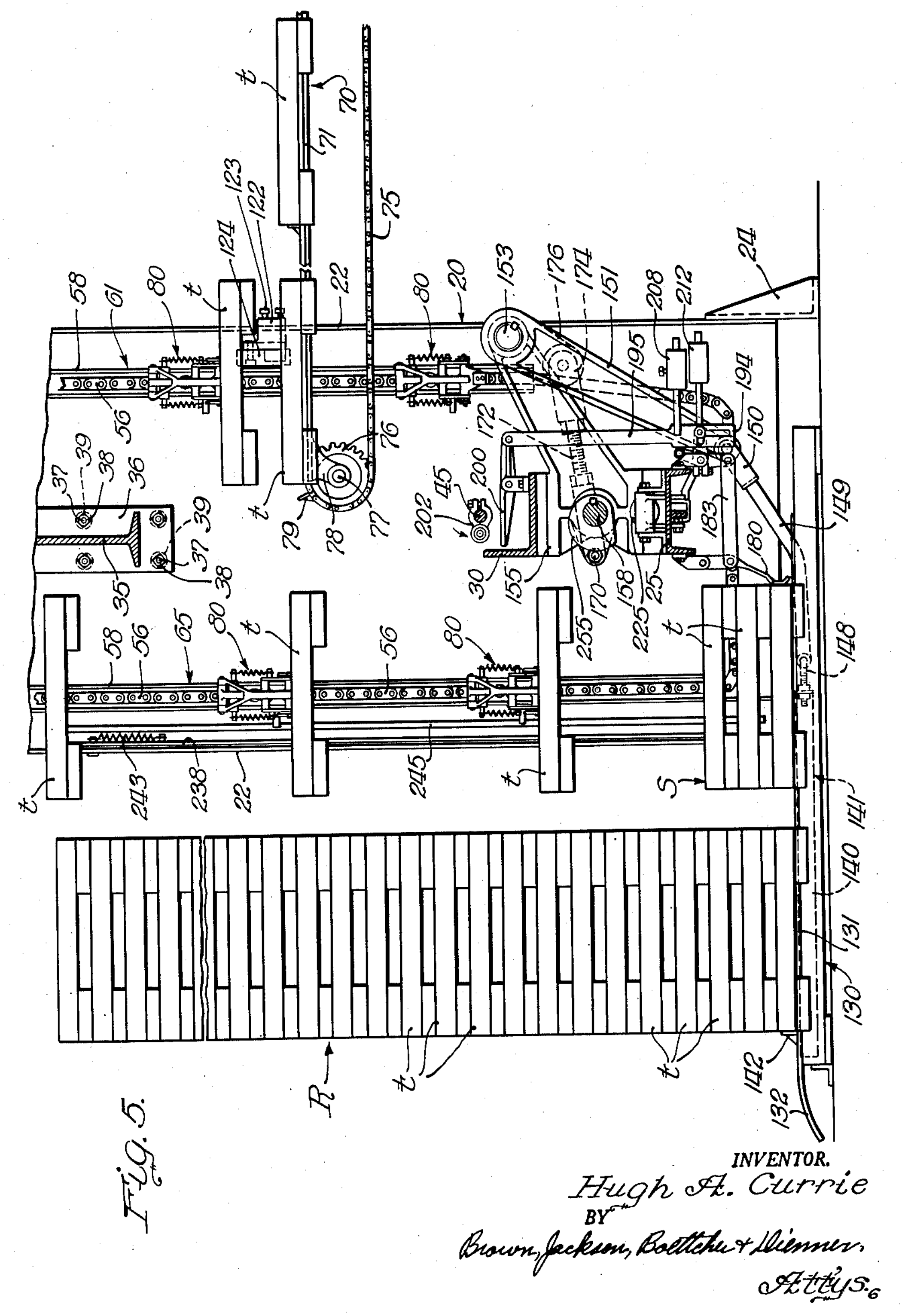
Figure 5 is a vertical sectional view, on an enlarged scale, of the lower portion of the feeder, taken from front to back thereof and looking toward the left as viewed from in front, this view also showing the forward portion of one of the molding machine conveyor chains and associated parts.
Figures 12, 13, 14:
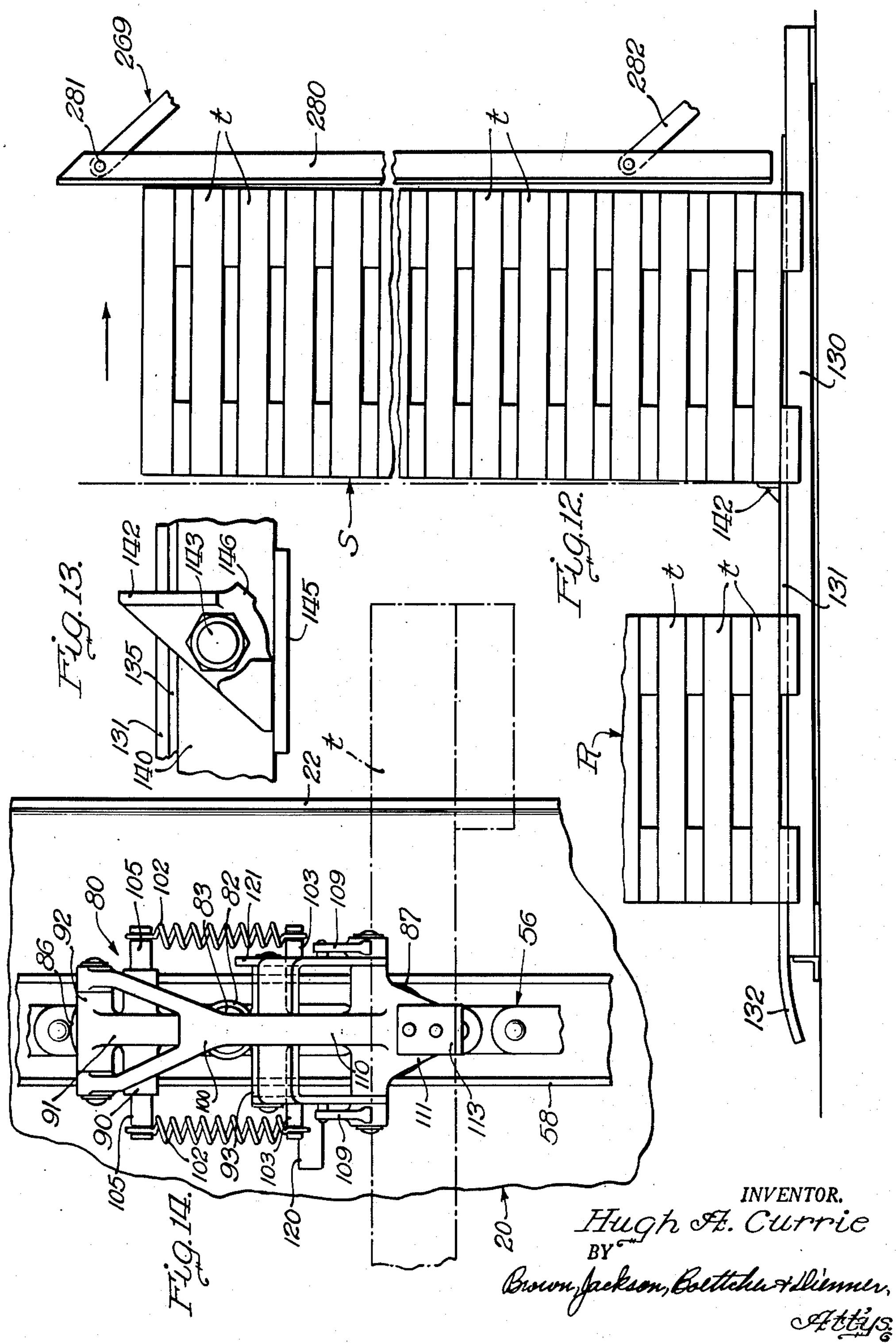
Figure 12 is a side view, on an enlarged scale, of the tray carriage frame and associated parts, showing a reserve stack of trays on the frame and a stack of trays being moved to the position which it is to occupy in the feeder.
Figure 13 is a detail fragmentary view of the tray carriage and one of the tray engaging cleats thereon, and associated parts, on an enlarged scale.
Figure 14 is a view, on an enlarged scale, of one of the tray hooks and associated parts as seen looking toward the left side of the feeder as viewed from in front.

In the normal operation of the feeder, a stack S of trays is positioned within the feeder and a reserve stack R of trays is positioned on the forward portion of the carriage frame 130, as shown in Figures 1, 5 and 13. The trays of the stack S are held in accurate alignment endwise by the straightener bars 238 (Figures 4 and 10) and are in contact with the control bar 280 (Figure 6) holding it in its rearward position, being then also in close proximity to the angle strips 271 and 271a effective for preventing any objectionable misalignment of the trays fore-and-aft of the feeder. When the straightener bars 238 are in their inner or projected positions, the hook release bars 245 are also in operative position. The tray hooks 80 travel forward at the lower portion of the feeder and then upward, and in the first part of their upward travel at the front of the feeder are released for unfolding or inward extension, by contact of the studs 120 with the release bars 245, as has been explained. The hooks 80 travel upward along the stack S of trays and grip the top tray of the stack and lift it therefrom. In the continued travel of the hooks, the tray carried thereby passes to the back of the feeder and then downward to the receiving station of the mogul tray conveyor 70, at which point the hooks are folded or retracted outward by contact of the trip fingers 121 with the block 147 (Figures 16 and 16A) as previously described, setting the tray upon the mogul conveyor at the receiving station thereof. Immediately after a tray has been set upon the mogul conveyor 70, the cleats of the chains 75 (Figure 6A) contact the tray *t* and push it into the mogul, the cleat 79 of one of the chains 75 thus passing out of contact with the lever 292. The lever 292 is then turned counterclockwise by the tension spring 297, into its normal rearward position, thus moving the link 290 forward into position such that pin 288 engages in the vertical arm of bayonet slot 289. When a succeeding cleat 79 of chain 75 swings the lever 292 in clockwise direction, shaft 285 is turned clockwise, thus throwing in or engaging the upper clutch in the casing 47. That causes turning of the shaft 45 through one complete revolution, during which the tray conveyor chains 56 of the feeder are advanced a distance equal to the space between two adjacent tray hooks 80. During this advancement of the chains 56, a tray at the back of the feeder is set upon the mogul conveyor 70 at the receiving station thereof, by folding or retraction of the hooks 80 carrying that tray, as previously described and as will be understood more clearly from Figures 5, 16 and 16A. During the first part of the turning of shaft 45, the link 290 is raised by the roller 201 carried by arm 202, thus releasing arm 287. This arm 287 is then returned to its normal position by the tension spring 295, positioning the trip finger 332 for tripping or releasing the upper clutch in the manner previously described. So long as there are trays in the feeder upon the carriage frame 130, the lower clutch in the casing 47 remains disengaged and actuation of the lever 197 by roller 201 is ineffective. Likewise, actuation of the plate 261 is ineffective so long as the control bar 280 is held in its rearward position by contact of the tray therewith.

When the last tray of the stack S is raised from the carriage frame 130, the tray actuated trip finger 180 (Figures 6A, 9 and 11) is released. The sleeve 185 is then turned clockwise (Figure 11—counterclockwise Figure 9) by its associated weight 189, thus swinging head 194 of link 195 rearward into such position that pin 206 of arm 207 engages in the horizontal arm of the bayonet slot 205. Shortly thereafter, the roller 201 carried by arm 202 actuates lever 197, thus turning the shaft 186 counterclockwise Figure 11—clockwise Figure 9) and moving the locking finger 214 downward out of the notches 217 (Figure 10) of the bars 215. The stack straightener bars 238, and with them the tray hook releasing bars 245, are then moved outward to inoperative positions by the associated tension springs 243 (Figure 5), moving the bars 215 outward. As the last tray of the stack S moves upward along the control bar 280, it holds that bar in its rearward position. Since the tray hook releasing bars 245 are now in their outer or inoperative position, the tray hooks traveling upward at the front of the feeder remain in their fully folded or retracted positions, so as to clear the entering reserve stack of trays. When the last tray of the stack in the feeder passes upward beyond the control bar 280, that bar moves downward and forward by gravity thus raising the rearward portion of plate 261. Shortly thereafter, when the last tray of the stack reaches a position above bar 280 such that it will clear the top tray of an entering stack of trays, the plate 261 is moved forward by roller 258, thus turning shaft 277 clockwise, as viewed in Figure 6, and throwing in the lower clutch in the casing 47.

It will be clear, from what has been said, that the lower clutch normally remains disengaged and is engaged only when the last tray of the stack in the feeder has been lifted above the control bar 280. When that tray has been lifted to the position stated, the lower clutch is thrown in, as noted, and the shaft 158—160 is then turned through one revolution. This turning of shaft 158 moves the tray carriage 141 rearward into the feeder and thereby moves the reserve stack R of trays into the feeder, after which the tray carriage 141 is returned to its normal forward position, as previously described. The entering stack of trays displaces the control bar 280 rearward thus lowering the rearward end of plate 261 and permitting turning of shaft 277 counterclockwise, with return of trip finger 318 (Figure 18) to its normal tripping position, by the compression spring 322. That assures that turning of the shaft 158 will be stopped at the end of one complete revolution thereof. The plate 261 is now in its normal position and is ineffective, when reciprocated, for actuating the shaft 277. As the stack of trays approaches its innermost position in the feeder, the eccentric 255 contacts rollers 225 thus swinging the upper arms 224 of the bell cranks 222 downward. That moves the bars 215 inward and, at about the same time, the trip finger 180 is moved rearward by contact of the bottom tray of the stack therewith. This rearward movement of trip finger 180 turns sleeve 185 counterclockwise, swinging the roller 193 forward. The head 194 of link 195 is then swung forward by its associated weight 208, so that the pin 206 carried by arm 207 is now disposed in the vertical arm of bayonet slot 205 in head 194 of link 195. Shortly thereafter the bars 215 reach their innermost positions, in which locking finger 214 moves upward into engagement with the notches 217, thus locking the bars 215 in their inner or retracted positions. The inward movement of the bars 215 returns the stack straightener bars 238 to their inwardly projected or operative positions, and also returns the hook release bars 245 to their operative positions, as previously explained. That occurs as the stack of trays reaches its innermost position in the feeder. Thereafter, the feeder resumes operation, under control of the tray conveyor of the mogul, as previously described. It will be seen that the drive of the tray conveyor chains 56 of the feeder is controlled by the mogul, is intermittent, and that those chains are advanced a distance equal to that between two adjacent tray hooks 80 upon each engagement of the upper clutch in the casing 47, controlling drive of the shaft 45. That is advantageous as assuring accurate timing of the operation of the feeder in respect to the operation of the mogul which, as previously noted, may frequently be stopped for a short period of time, for various reasons. It will also be noted that the movements of the tray straightening bars and of the tray hook releasing bars to and from operative positions, and the operation of the tray carriage, are tray controlled in such manner as effectively to guard against interference with an entering reserve stack of trays by trays within the feeder, or by the tray hooks.

It will be noted (Figure 18) that the worm gear 308, which drives the shaft 160—158 for operating the tray carriage, is of materially greater diameter than the worm gear 307. The gears 307 and 308 are so proportioned, and the angular relation of arm 202 to shaft 45 (Figures 6, 6A and 6B) is such, that the entering or new stack of trays is in full operative position in the feeder when the last tray of the preceding stack has been raised to a position above the new stack somewhat less than the distance between two successive tray hooks 80. Accordingly, of the pairs of opposed tray hooks 80 now in contact with the ends of the trays of the new stack, the pair thereof next succeeding the pair of hooks 80 carrying the bottom tray of the preceding stack will be at, or adjacent, the ends of the top tray of the new stack. When the upper clutch is again thrown in and the shaft 45 is again turned through one revolution, as previously explained, the top tray is lifted from the new stack and the tray conveyor is advanced a distance equal to that between two successive tray hooks 80. In that manner I avoid any interruption in delivery of trays to the mogul when moving a new stack of trays into the feeder, which is of importance and is conducive to increased output of the mogul. As will be understood from what has been said, each stack of trays delivered to the feeder contains the same number of trays as the other stacks, and such stacks are of uniform height.

It will be understood that changes in detail may be made without departing from the field and scope of my invention, and I intend to include all such variations, as fall within the scope of the appended claims, in this application in which the preferred form only of my invention has been disclosed.

I claim:

1. In a feeder for delivering trays to a receiving station, a tray conveyor comprising spaced apart conveyor members each having an upwardly moving front run and a downwardly moving rear run, opposed tray gripping and conveying hooks carried by said members movable to tray engaging position and to tray releasing position outwardly beyond and clear of the trays, means for moving said hooks at the rear run of said conveyor to releasing position at a predetermined level and for releasing them for return to tray gripping position as they move upward at the front of the conveyor, a reciprocatory tray carriage normally in front of said conveyor spaced therefrom for moving inward thereto a stack of trays, and means controlled by trays carried by the front run of said conveyor for moving said carriage inward and then moving said carriage outward and returning it to its normal position responsive to raising of the lowermost tray at the front of said conveyor by the latter to a height sufficient to clear the entering stack of trays.

2. In a feeder for delivering trays to a receiving station, a tray conveyor comprising spaced apart conveyor members each having an upwardly moving front run and a downwardly moving rear run, opposed tray gripping and conveying hooks carried by said members having a projected tray engaging position and a retracted tray releasing position in which they are disposed outwardly beyond and clear of the trays, said hooks comprising yielding means effective for moving them to full releasing position when they have been retracted to a predetermined extent and urging them toward gripping position when they have been projected to a predetermined extent, means for retracting said hooks at the rear run of said conveyor to said predetermined extent at a predetermined level, means comprising hook releasing members at the front runs of said conveyor members normally projected inward effective for projecting said hooks at said front runs to said predetermined extent and movable outward to ineffective position, a tray carriage normally in front of said conveyor spaced therefrom for moving a stack of trays thereto, and means controlled by trays at the front of said conveyor for moving said hook releasing members outward to ineffective position, moving said carriage inward when the lowermost tray at the front of said conveyor has been raised thereby to a height to clear the entering stack and then returning said carriage and said hook releasing members to their normal positions.

3. In a feeder for delivering trays to a receiving station, a tray conveyor having an upwardly moving front run and a downwardly moving rear run with tray hooks movable inward to tray gripping position and outward to tray releasing position in which they are clear of the trays, means for moving said hooks at the rear run of said conveyor outward to tray releasing position at a predetermined level, means for moving said hooks at the front of said conveyor inward to tray gripping position comprising hook releasing members movable inward to effective position and outward to ineffective position, a tray carriage for moving a stack of trays to said conveyor at the front thereof, and means controlled by trays at the front of said conveyor for moving said hook releasing members outward to ineffective position, moving said carriage inward when the lowermost tray at the front of said conveyor has been raised thereby to a height to clear an entering stack of trays and then returning said releasing members to their effective positions.

4. In a feeder for delivering trays to a receiving station, a tray conveyor having an upwardly moving front run and a downwardly moving rear run provided with opposed tray gripper hooks movable inward to tray gripping position and outward to tray releasing position clear of the trays, means for moving said hooks at the rear run of said conveyor outward to tray releasing position at a predetermined level, means for moving said hooks at the front of said conveyor inward to tray gripping position comprising hook releasing members movable inward to effective position and outward to ineffective position, a tray carriage for moving a stack of trays to said conveyor at the front thereof, and means controlled by the bottom tray of a stack in the feeder for moving said hook releasing members outward to ineffective position when said bottom tray is first raised by said conveyor, moving said carriage to said conveyor when said bottom tray is raised thereby to a height to clear an entering stack of trays, and then returning said releasing members to their effective positions.

5. In a feeder for delivering trays to a receiving station, a tray conveyor having an upwardly moving front run and a downwardly moving rear run provided with opposed tray gripper hooks movable inward to tray gripping position and outward to tray releasing position, means for moving said hooks at the rear run of said conveyor outward to tray releasing position at a predetermined level, straightener bars movable inward into contact with the ends of the trays of a stack moved into the feeder for aligning the trays of the stack and movable outward to a position to clear the trays of an entering stack, means for moving said hooks at the front of said conveyor inward to gripping position comprising hook releasing members movable with said bars inward to effective position and outward to ineffective position, a tray carriage for moving a stack of trays to said conveyor at the front thereof, and means controlled by the bottom tray of a stack in the feeder for moving said bars and releasing members outward to ineffective position when said bottom tray is first raised by said conveyor, moving said carriage to said conveyor when said bottom tray is raised thereby to a height to clear an entering stack of trays and then moving said bars and releasing members inward.

6. In a feeder for delivering trays to a receiving station, a tray conveyor having an upwardly moving front run and a downwardly moving rear run provided with uniformly spaced opposed tray gripper hooks movable inward to tray gripping position and outward to tray releasing position clear of the trays, means for moving said hooks at the rear of said conveyor outward to tray releasing position at a predetermined level, means for moving said hooks at the front of said conveyor inward to tray gripping position comprising hook releasing members movable inward to effective position and yieldingly urged outward to ineffective position, a tray carriage for moving a stack of trays to said conveyor at the front thereof, a conveyor drive shaft, driving connections between said shaft and said conveyor effective for advancing the latter a distance equal to that between two adjacent hooks responsive to each revolution of said shaft, means adapted to be actuated by a moving part of a machine associated with said feeder effective for intermittently driving said shaft and turning it through one revolution, means actuated by said shaft and controlled by the bottom tray of a stack in the feeder effective for normally holding said releasing members in effective position and releasing them for movement to ineffective position responsive to raising of said bottom tray by said conveyor, means for moving said carriage to said conveyor when said bottom tray is raised thereby to a height to clear an entering stack of trays, and means actuated by said shaft for returning said releasing members to effective position when the entering stack of trays is positioned approximately at the front of said conveyor.

7. In a feeder for delivering trays to a receiving station, a tray conveyor having an upwardly moving front run and a downwardly moving rear run provided with uniformly spaced opposed tray gripper hooks movable inward to tray gripping position and outward to tray releasing position, means for moving said hooks at the rear of said conveyor outward to tray releasing position at a predetermined level, straightener bars movable inward into contact with the ends of the trays of a stack moved into the feeder for aligning the trays of the stack and yieldingly urged outward to a position to clear the trays of an entering stack, means for moving said hooks at the front of said conveyor inward to tray gripping position comprising hook releasing members movable with said bars inward to effective position and outward to ineffective position, a tray carriage for moving a stack of trays to said conveyor at the front thereof, a conveyor drive shaft, driving connections between said shaft and said conveyor effective for advancing the latter a distance equal to that between two adjacent hooks responsive to each revolution of said shaft, means adapted to be actuated by a moving part of a machine associated with said feeder effective for intermittently driving said shaft and turning it through one revolution, means actuated by said shaft and controlled by the bottom tray of a stack in the feeder effective for normally holding said bars and releasing members in effective position and releasing them for movement to ineffective position responsive to raising of said bottom tray by said conveyor, means for moving said carriage to said conveyor when said bottom tray is raised thereby to a height to clear an entering stack of trays, and means actuated by said shaft for returning said bars and releasing members to effective position when the entering stack of trays is positioned approximately at the front of said conveyor.

8. In a feeder for delivering trays to a receiving station, a tray conveyor comprising spaced apart conveyor members each having an upwardly moving front run and a downward moving rear run and provided with uniformly spaced gripper hooks movable inward to tray gripping position and outward to tray releasing position, means for moving said hooks at the rear of said conveyor outward to tray releasing position, means for moving said hooks at the front of said conveyor inward to tray gripping position comprising hook releasing members movable to effective position and to ineffective position, a carriage frame extending between said conveyor members at the front of said conveyor, a reciprocatory tray carriage mounted on said frame having means for moving inward thereof a stack of trays thereon, a conveyor drive shaft, driving connections between said shaft and said conveyor effective for advancing the latter a distance equal to that between two adjacent hooks responsive to each revolution of said shaft, means for intermittently driving said shaft and turning it through one revolution, a carriage operating shaft having crank connection to said carriage, normally ineffective means for driving said carriage operating shaft and turning it through one revolution, normally ineffective control means actuatable by said conveyor drive shaft for rendering said carriage shaft driving means effective, and trip release means controlled by the lowermost tray at the front of said conveyor for rendering said control means effective when said lowermost tray has been raised by said conveyor to a height sufficient to clear a stack of trays moved inward thereof by said carriage.

9. In a feeder for delivering trays to a receiving station, a tray conveyor comprising spaced apart conveyor members each having an upwardly moving front run and a downwardly moving rear run and provided with uniformly spaced gripper hooks movable inward to tray gripping position and outward to tray releasing position, means for moving said hooks at the rear of said conveyor outward to tray releasing position, means for moving said hooks at the front of said conveyor inward to tray gripping position comprising hook releasing members movable to effective position and to ineffective position, a carriage frame extending between said conveyor members at the front of said conveyor having inwardly and downwardly inclined tray supporting surfaces, a reciprocatory tray carriage mounted on said frame having means for moving inward thereof a stack of trays supported on said surfaces, a conveyor drive shaft, driving connections between said shaft and said conveyor effective for advancing the latter a distance equal to that between two adjacent hooks responsive to each revolution of said shaft, means for intermittently driving said shaft and turning it through one revolution, a carriage operating shaft having crank connection to said carriage, normally ineffective means for driving said carriage operating shaft and turning it through one revolution, normally ineffective control means actuatable by said conveyor drive shaft for rendering said carriage shaft drive means effective, a control bar substantially parallel with the front run of said conveyor yieldingly urged to a forward position in which it is disposed to be displaced to a rearward position by a stack of trays moved by said carriage inward to the front run of said conveyor, and connections between said bar and said control means for rendering the latter ineffective in the rearward position and effective in the forward position of said bar.

10. In a feeder for delivering trays to a receiving station, a tray conveyor having an upwardly moving front run and a downwardly moving rear run, straightener bars movable inward to operative position into contact with the ends of the trays of a stack at said front run for aligning the trays and movable outward to inoperative position to clear the trays of an entering stack, and means controlled by the bottom tray of a stack at said front run and an entering stack of trays effective for moving said bars to inoperative position when said bottom tray is raised to a height to clear the entering stack and to operative position when the entering stack has been moved into said feeder in position at said front run.

11. In a feeder for delivering trays to a receiving station, a tray conveyor having an upwardly moving front run and a downwardly moving rear run provided with tray grippers movable to projected tray engaging position and to retracted tray releasing position, straightener bars movable inward to operative position into contact with the ends of the trays of a stack at said front run for aligning the trays and movable outward to inoperative position to clear the trays of an entering stack, tray gripper release bars movable with said straightener bars to operative position effective for releasing said grippers when in retracted position for movement to projected position and to inoperative position ineffective for releasing said grippers in the movement of said straightener bars to operative and inoperative position respectively, and means controlled by the bottom tray of a stack at said front run and an entering stack of trays effective for moving said bars to inoperative position when said bottom tray is raised to a height to clear the entering stack and to operative position when the entering stack has been moved into said feeder in position at said front run.

HUGH A. CURRIE.

References Cited in the file of this patent

UNITED STATES PATENTS

| Number | Name | Date |
|---|---|---|
| 1,601,971 | Knapp, Jr. | Oct. 5, 1926 |
| 2,028,410 | Rapisarda | Jan. 21, 1936 |
| 2,089,385 | Llewellyn et al. | Aug. 10, 1937 |
| 2,266,170 | Currie | Dec. 16, 1941 |
| 2,403,942 | Mathers | July 16, 1946 |
| 2,407,782 | Hardy | Sept. 17, 1946 |
| 2,459,204 | Van Vleck | Jan. 18, 1949 |
| 2,491,298 | Carter | Dec. 13, 1949 |